US012126570B2

(12) United States Patent
Marinier et al.

(10) Patent No.: US 12,126,570 B2
(45) Date of Patent: Oct. 22, 2024

(54) UPLINK FEEDBACK METHODS FOR OPERATING WITH A LARGE NUMBER OF CARRIERS

(71) Applicant: InterDigital Patent Holdings, Inc., Wilmington, DE (US)

(72) Inventors: Paul Marinier, Brossard (CA); Ghyslain Pelletier, Montreal (CA); J. Patrick Tooher, Montreal (CA); Pouriya Sadeghi, San Diego, CA (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/460,935

(22) Filed: Sep. 5, 2023

(65) Prior Publication Data

US 2023/0421331 A1    Dec. 28, 2023

Related U.S. Application Data

(63) Continuation of application No. 17/340,933, filed on Jun. 7, 2021, now Pat. No. 11,791,968, which is a
(Continued)

(51) Int. Cl.
*H04L 5/00*      (2006.01)
*H04L 1/00*      (2006.01)
(Continued)

(52) U.S. Cl.
CPC .......... *H04L 5/0055* (2013.01); *H04L 1/0026* (2013.01); *H04L 1/003* (2013.01);
(Continued)

(58) Field of Classification Search
CPC ..... H04L 5/0055; H04L 1/0026; H04L 1/003; H04L 1/0057; H04L 1/0059;
(Continued)

(56) References Cited

U.S. PATENT DOCUMENTS 8,582,638 B2   11/2013   Earnshaw et al.
8,750,143 B2   6/2014    Yin
(Continued)

FOREIGN PATENT DOCUMENTS

CN   101908951 A   12/2010
CN   101989897 A   3/2011
(Continued)

OTHER PUBLICATIONS

Third Generation Partnership Project, Intel Corporation, "Scheduling of Multiple DL/UL TBs for eMTC", R1-1813688, 3GPP TSG RAN WG1 Meeting #94bis, Spokane, USA, Nov. 12-16, 2018, 4 pages.
(Continued)

*Primary Examiner* — Ajay Cattungal
(74) *Attorney, Agent, or Firm* — Flaster Greenberg, P.C.

(57) ABSTRACT

A wireless transmit/receive unit (WTRU) may receive one or more physical downlink shared channel (PDSCH) transmissions and each PDSCH transmission may be associated with downlink control information (DCI) and a group of PDSCH transmissions. Further, the WTRU may determine a first group or a second group based on an indication received in DCI associated with at least one of the PDSCH transmissions. Then, the WTRU may generate hybrid automatic repeat request (HARQ)-acknowledgment (ACK) feedback for data received in one or more PDSCH transmissions associated with the determined group. Moreover, the WTRU may transmit the HARQ-ACK feedback. In an example, the DCI which includes the indication may schedule a plurality of PDSCH transmissions included in the determined group. In another example, the DCI which includes the indication may further include a first codepoint mapped to the first group or a second codepoint mapped to the second group.

17 Claims, 7 Drawing Sheets

Related U.S. Application Data continuation of application No. 16/827,022, filed on Mar. 23, 2020, now Pat. No. 11,032,053, which is a continuation of application No. 15/546,559, filed as application No. PCT/US2016/015413 on Jan. 28, 2016, now Pat. No. 10,601,567.

(60) Provisional application No. 62/250,890, filed on Nov. 4, 2015, provisional application No. 62/214,552, filed on Sep. 4, 2015, provisional application No. 62/166,523, filed on May 26, 2015, provisional application No. 62/161,057, filed on May 13, 2015, provisional application No. 62/144,835, filed on Apr. 8, 2015, provisional application No. 62/108,849, filed on Jan. 28, 2015.

(51) Int. Cl.
*H04L 1/1607* (2023.01)
*H04L 1/1867* (2023.01)
*H04W 52/02* (2009.01)
*H04W 72/02* (2009.01)
*H04L 1/12* (2006.01)
*H04W 72/21* (2023.01)

(52) U.S. Cl.
CPC .......... *H04L 1/0057* (2013.01); *H04L 1/0059* (2013.01); *H04L 1/0061* (2013.01); *H04L 1/0073* (2013.01); *H04L 1/1671* (2013.01); *H04L 1/1893* (2013.01); *H04W 52/0216* (2013.01); *H04W 72/02* (2013.01); *H04L 2001/125* (2013.01); *H04W 72/21* (2023.01); *Y02D 30/70* (2020.08)

(58) Field of Classification Search
CPC ... H04L 1/0061; H04L 1/0073; H04L 1/1671; H04L 1/1893; H04L 2001/125; H04W 52/0216; H04W 72/02; H04W 72/21; Y02D 30/70
See application file for complete search history.

(56) References Cited

U.S. PATENT DOCUMENTS

| | | | |
|---|---|---|---|
| 8,767,647 | B2 | 7/2014 | Heo et al. |
| 9,485,060 | B2 | 11/2016 | Nayeb Nazar et al. |
| 9,584,287 | B2 | 2/2017 | Seo et al. |
| 9,722,735 | B2 | 8/2017 | Shin et al. |
| 10,601,567 | B2 | 3/2020 | Marinier et al. |
| 10,917,199 | B2 | 2/2021 | Sun et al. |
| 2009/0300456 | A1 | 12/2009 | Pelletier et al. |
| 2011/0103323 | A1 | 5/2011 | Wang et al. |
| 2011/0110246 | A1 | 5/2011 | Damnjanovic et al. |
| 2011/0243066 | A1 | 10/2011 | Nayeb Nazar |
| 2011/0249578 | A1 | 10/2011 | Nayeb Nazar et al. |
| 2011/0249656 | A1 | 10/2011 | Cai et al. |
| 2012/0039279 | A1 | 2/2012 | Chen et al. |
| 2012/0218882 | A1 | 8/2012 | Ko et al. |
| 2012/0236812 | A1 | 9/2012 | Chen et al. |
| 2013/0117622 | A1 | 5/2013 | Blankenship et al. |
| 2013/0142134 | A1 | 6/2013 | Zhu et al. |
| 2013/0223301 | A1 | 8/2013 | Lee et al. |
| 2014/0226551 | A1 | 8/2014 | Ouchi et al. |
| 2014/0269338 | A1* | 9/2014 | Jung ............... H04L 5/0055 370/329 |
| 2014/0369242 | A1* | 12/2014 | Ng ............... H04L 5/001 370/280 |
| 2015/0092702 | A1 | 4/2015 | Chen et al. |
| 2015/0264708 | A1 | 9/2015 | Li et al. |
| 2015/0365925 | A1* | 12/2015 | Fu ............... H04W 72/21 370/329 |
| 2016/0192388 | A1* | 6/2016 | Ekpenyong ........ H04L 5/001 370/329 |
| 2017/0048052 | A1 | 2/2017 | Lee et al. |
| 2017/0111163 | A1 | 4/2017 | Yang et al. |
| 2017/0273070 | A1* | 9/2017 | Yi ............... H04L 5/0055 |
| 2017/0303267 | A1 | 10/2017 | Shin et al. |
| 2018/0006791 | A1 | 1/2018 | Marinier et al. |
| 2018/0019843 | A1 | 1/2018 | Papasakellariou |
| 2018/0123765 | A1 | 5/2018 | Cao et al. |
| 2018/0123769 | A1 | 5/2018 | Pelletier et al. |
| 2018/0167173 | A1 | 6/2018 | Guan et al. |
| 2018/0184418 | A1 | 6/2018 | Takeda et al. |
| 2019/0238275 | A1 | 8/2019 | Sun et al. |
| 2021/0167900 | A1 | 6/2021 | Karaki et al. |

FOREIGN PATENT DOCUMENTS

| | | |
|---|---|---|
| CN | 102088343 A | 6/2011 |
| CN | 102511143 A | 6/2012 |
| CN | 102577209 A | 7/2012 |
| CN | 102714580 A | 10/2012 |
| CN | 102763361 A | 10/2012 |
| CN | 102812658 A | 12/2012 |
| CN | 102959890 A | 3/2013 |
| CN | 103119884 A | 5/2013 |
| CN | 103168441 A | 6/2013 |
| CN | 103299571 A | 9/2013 |
| CN | 103796327 A | 5/2014 |
| CN | 107409014 A | 11/2017 |
| CN | 105594286 B | 1/2019 |
| EP | 2806593 A1 | 11/2014 |
| EP | 3493437 A1 | 6/2019 |
| JP | 2012/526473 A | 10/2012 |
| JP | 2012/531114 A | 12/2012 |
| JP | 2013/077926 A | 4/2013 |
| JP | 2015-512174 A | 4/2015 |
| JP | 2019528619 A | 10/2019 |
| WO | WO 2011/085230 A2 | 7/2011 |
| WO | WO 2011/148319 A1 | 12/2011 |
| WO | WO 2016/163759 A1 | 10/2016 |
| WO | WO 2016/208680 A1 | 12/2016 |
| WO | WO 2018/028413 A1 | 2/2018 |

OTHER PUBLICATIONS

Third Generation Partnership Project, ZTE, "Summary on Multiple TB scheduling enhancement for NB-IoT", R1-1813757, 3GPP TSG-RAN WG1 Meeting #95, Spokane, USA, Nov. 12-16, 2018, 11 pages.

Dahlman et al., 4G: LTE/LTE-Advanced for Mobile Broadband, Academic Press, 2nd Edition (Dec. 20, 2013).

Third Generation Partnership Project, "Dynamic adaptation of PUCCH formats for HARQ-ACK feedback," Huawei et al., R1-155093, 3GPP TSG RAN WG1 Meeting #82bis, Malmo, Sweden (Oct. 5-9, 2015).

Third Generation Partnership Project, "Power control to support up to 32 component carriers," Huawei et al., R1-152465, 3GPP TSG RAN WG1 Meeting #81, Fukuoka, Japan (May 25-29, 2015).

Third Generation Partnership Project, "PUCCH Power Control in eCA", Samsung, R1-156752, 3GPP TSG-RAN WG1 Meeting #83, Anaheim, USA, Nov. 16-20, 2015, 4 pages.

Third Generation Partnership Project, Technical Specification Group Radio Access network; NR; Physical layer procedures for control (Release 15), 3GPP TS 38.213 V15.0.0, Dec. 2017, 56 pages.

Third Generation Partnership Project, "CSI reporting for TDD-FDD CA," Ericsson, R1-135652, 3GPP TSG RAN WG1 Meeting #75, San Francisco, USA (Nov. 11-15, 2013).

Third Generation Partnership Project, "Enabling LTE carrier aggregation of up to 32 component carriers," Interdigital Communications, R1-150537, 3GPP TSG-RAN WG1 #80, Athens, Greece (Feb. 9-13, 2015).

Third Generation Partnership Project, "Evaluation of PUCCH Proposals for Carrier Aggregation," Ericsson et al., R1-101731, 3GPP TSG-RAN WG1 #60bis, Beijing, China (Apr. 12-16, 2010).

Third Generation Partnership Project, "HARQ enhancements in NR unlicensed", R1-1805918, 3GPP TSG RAN WG1 Meeting #93, Busan, Korea, May 21-25, 2018, 5 pages.

(56) References Cited

OTHER PUBLICATIONS

Third Generation Partnership Project, "Introduction of Rel-13 eCA," Change Request 36.211 CR 0208 rev 1, Current version: 12.7.0, Ericsson, R1-157912, 3GPP TSG-RAN WG1 Meeting #83, Anaheim, USA (Nov. 15-22, 2015).
Third Generation Partnership Project, "Necessary Mechanisms and Enhancements to Support CA of up to 32 Carriers", LG Electronics, R1-150207, 3GPP TSG RAN WG1 Meeting #80, Athens, Greece, Feb. 9-13, 2015, 5 pages.
Third Generation Partnership Project, "Power control for up to 32 component carriers," Huawei et al., R1-151875, 3GPP TSG RAN WG1 Meeting #80bis, Belgrade, Serbia (Apr. 20-24, 2015).
Third Generation Partnership Project, "Study on NR-based Access to Unlicensed Spectrum", Qualcomm Incorporated, RP-172021, 3GPP TSG RAN \fleeting #77, Sapporo, Japan, Sep. 11, 2017, 5 pages.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.4.0 (Dec. 2014).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.8.0 (Dec. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V13.2.0 (Dec. 2015).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.3.0 (Dec. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.7.0 (Dec. 2015).
Third Generation Partnership Project, "Technical Specification Group Radio Access Network; Evolved Universal Terrestrial Radio Access (E-UTRA); Multiplexing and channel coding (Release 12)," 3GPP TS 36.212 V13.0.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.1.0 (Mar. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.4.0 (Dec. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V13.0.0 (Dec. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.1.0 (Mar. 2014).

Third Generation Partnership Project, "Technical Specification Group Radio Access Network; Evolved Universal Terrestrial Radio Access (E-UTRA); Physical layer procedures (Release 12)," 3GPP TS 36.213 V12.4.0 (Dec. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.8.0 (Dec. 2015).
Third Generation Partnership Project, "Technical Specification Group Radio Access Network; Evolved Universal Terrestrial Radio Access (E-UTRA); Physical layer procedures (Release 12)," 3GPP TS 36.213 V13.0.0 (Dec. 2015).
Third Generation Partnership Project, "Technical Specification Group Radio Access Network; Evolved Universal Terrestrial Radio Access (E-UTRA); Physical layer; Measurements (Release 12)," 3GPP TS 36.214 V12.1.0 (Dec. 2014).
Third Generation Partnership Project, "Technical Specification Group Radio Access Network; Evolved Universal Terrestrial Radio Access (E-UTRA); Physical layer; Measurements (Release 12)," 3GPP TS 36.214 V12.2.0 (Mar. 2015).
Third Generation Partnership Project, "Technical Specification Group Radio Access Network; Evolved Universal Terrestrial Radio Access (E-UTRA); Physical layer; Measurements (Release 13)," 3GPP TS 36.214 V13.0.0 (Dec. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.4.1 (Dec. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.8.0 (Dec. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).
Third Generation Partnership Project, "Technical Specification Group Radio Access Network; Evolved Universal Terrestrial Radio Access (E-UTRA); Services provided by the physical layer (Release 13)," 3GPP TS 36.302 V12.2.0 (Dec. 2014).
Third Generation Partnership Project, "Technical Specification Group Radio Access Network; Evolved Universal Terrestrial Radio Access (E-UTRA); Services provided by the physical layer (Release 13)," 3GPP TS 36.302 V12.6.0 (Dec. 2015).
Third Generation Partnership Project, "Technical Specification Group Radio Access Network; Evolved Universal Terrestrial Radio Access (E-UTRA); Services provided by the physical layer (Release 13)," 3GPP TS 36.302 V13.0.0 (Dec. 2015).
Third Generation Partnership Project, "Technical Specification Group Radio Access Network; Study on Licensed-Assisted Access to Unlicensed Spectrum; (Release 13)," 3GPP TR 36.889 V0.1.1 (Nov. 2014).
Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).
Third Generation Partnership Project, CATT, "Details on ACK/NAK transmission for CA," R1-104313, 3GPP TSG RAN WG1 Meeting #62, Madrid, Spain (Aug. 23-27, 2010).
Third Generation Partnership Project, Huawei et al., "Remaining issues for PUCCH on Scell," R1-152461, 3GPP TSG RAN WG1 Meeting #81, Fukuoka, Japan (May 25-29, 2015).
Third Generation Partnership Project, Huawei, "Introduction of Rel 13 feature of eCA," R1-157915, 3GPP TSG-RAN WG1 Meeting #83, Change Request 36.212 CR 0178 rev 1, Current version: 12.6.0, Anaheim, USA (Nov. 15-22, 2015).
Third Generation Partnership Project, Interdigital Communications, "HARQ-ACK codebook determination," R1-154309, 3GPP TSG-RAN WG1 Meeting #82, Beijing, China (Aug. 24-28, 2015).
Third Generation Partnership Project, Interdigital Communications, "HARQ-ACK codebook determination,", R1-155527, 3GPP TSG-RAN WG1 Meeting #82bis, Malmo, Sweden (Oct. 5-9, 2015).

(56) References Cited

OTHER PUBLICATIONS

Third Generation Partnership Project, Interdigital Communications, "HARQ-ACK reporting for aggregation of up to 32 carriers," R1-153081, 3GPP TSG-RAN WG1 Meeting #81, Fukuoka, Japan (May 25-29, 2015).

Third Generation Partnership Project, Interdigital Communications, "HARQ-ACK reporting for up to 32 carriers," R1-152099, 3GPP TSG-RAN WG1 Meeting #80bis, Belgrade, Serbia (Apr. 20-24, 2015).

Third Generation Partnership Project, Interdigital Communications, "Remaining aspects of dynamic HARQ-ACK codebook adaptation," R1-157140, 3GPP TSG-RAN WG1 Meeting #83, Anaheim, California, USA (Nov. 15-22, 2015).

Third Generation Partnership Project, Motorola Mobility, "Introduction of eCA," Change Request 36.213 CR 0539 rev -, Current version: 12.7.0, 3GPP TSG-RAN WG1 Meeting #83, R1-15xxx, Anaheim, USA (Nov. 15-22, 2015).

Third Generation Partnership Project, Nokia Corporation, "New WI proposal: LTE Carrier Aggregation Enhancement Beyond 5 Carriers," RP-142286, 3GPP TSG RAN Meeting #66, Maui, Hawaii (Dec. 8-11, 2014).

Third Generation Partnership Project, Nokia Networks et al., "WF on Periodic CSI reporting configuration," R1-156372, 3GPP TSG RAN WG1 #82bis, Malmo, Sweden (Oct. 5-9, 2015).

Third Generation Partnership Project, Nokia Networks, "On HARQ-ACK Feedback Enhancements, " R1-154444, 3GPP TSG-RAN WG1 Meeting #82, Beijing, P.R. China (Aug. 24-28, 2015).

Third Generation Partnership Project, R1-153701, 3GPP TSG RAN WG1 Meeting #82, Beijing, China (Aug. 24-28, 2015).

Third Generation Partnership Project, Samsung, "Priority rules for CSI feedback for eCA," R1-154120, 3GPP TSG RAN WG1 #82, Beijing, China (Aug. 24-28, 2015).

Third Generation Partnership Project, Technical Specification Group Radio Access Network; NR; Medium Access Control (MAC) protocol specification (Release 15), 3GPP TS 38.321 V15.1.0, Mar. 2018, 67 Pages.

* cited by examiner

UPLINK FEEDBACK METHODS FOR OPERATING WITH A LARGE NUMBER OF CARRIERS

CROSS REFERENCE TO RELATED APPLICATIONS

This application is a continuation of U.S. patent application Ser. No. 17/340,933, filed Jun. 7, 2021, which is a continuation of U.S. patent application Ser. No. 16/827,022, filed Mar. 23, 2020, which issued as U.S. Pat. No. 11,032,053 on Jun. 8, 2021, which is a continuation of U.S. patent application Ser. No. 15/546,559 filed Jul. 26, 2017, which issued as U.S. Pat. No. 10,601,567 on Mar. 24, 2020, which is the U.S. National Stage, under 35 U.S.C. § 371, of International Application No. PCT/US2016/015413 filed Jan. 28, 2016, which claims the benefit of U.S. Provisional Application No. 62/250,890, filed Nov. 4, 2015, U.S. Provisional Application No. 62/214,552, filed Sep. 4, 2015, U.S. Provisional Application No. 62/166,523, filed May 26, 2015, U.S. Provisional Application No. 62/161,057, filed May 13, 2015, U.S. Provisional Application No. 62/144,835, filed Apr. 8, 2015, and U.S. Provisional Application No. 62/108,849, filed Jan. 28, 2015, the entire contents of which are hereby incorporated by reference herein.

BACKGROUND

Carrier aggregation for Long Term Evolution (LTE) was introduced in $3^{rd}$ Generation Partnership Project (3GPP) Release 10. This feature allows a wireless transmit/receive unit (WTRU) to transmit and receive on more than one carrier simultaneously, resulting in an increase of its peak data rate over the air interface. The maximum number of carriers that may be aggregated is five (5), for a maximum bandwidth of 100 megahertz (MHz).

Transmission of data in the downlink in LTE may be performed using the physical downlink shared channel (PDSCH). This physical channel supports hybrid automatic repeat request (HARQ) transmission, in which the receiver (at the WTRU) may combine successive transmissions of a transport block to increase the probability of successful decoding at each retransmission. The WTRU may report, for a given reception attempt of a transport block, that the reception has succeeded with an acknowledgement (ACK) or has not succeeded with a negative acknowledgement (NACK). In some cases, the WTRU may also report that it did not detect that a transport block was transmitted, such as in discontinuous transmission (DTX).

SUMMARY

A method and apparatus for uplink feedback for operating with a large number of carriers are disclosed herein. A method in a wireless transmit/receive unit (WTRU) includes receiving a downlink control information (DCI), wherein the DCI schedules a physical downlink shared channel (PDSCH) transmission and the DCI includes an indication, determining whether a hybrid automatic repeat request (HARQ) acknowledgment (ACK)/negative acknowledgement (NACK) (A/N) report is expected for the PDSCH transmission based on the indication in the DCI, and receiving a HARQ A/N report on a condition that one is expected for the PDSCH transmission.

Further examples include a solution for reducing HARQ-ACK payload, increasing physical uplink control channel (PUCCH) payload, increasing uplink control information (UCI) payload in a physical uplink shared channel (PUSCH) and determining the resource or sub-resource used for the transmission of a feedback group, or a combination of feedback groups, based on a combination of downlink control signaling that is associated with any PDSCH and of an index or order associated with this feedback group.

Additional examples include the dynamic scheduling of UCI on a PUCCH, and an index for each downlink assignment, to enable a dynamic codebook and feedback compression. In an example, the WTRU may make a determination of order of the information bits in the codebook. The WTRU may make a selection of a codebook permutation to optimize decoding performance. A further example includes a codebook indicator. Further, a specific group of carriers to select may be determined based on which carriers assignments are received for. In addition, the codebook may be determined using one or more methods. Also, an A/N resource indicator (ARI) may be used for the determination of a final assignment. Further, multiple channel state information (CSI) reports may be transmitted in a subframe using one or more methods. For example, the WTRU may be configured with a maximum payload for each PUCCH resource that can be used for the transmission of HARQ-ACK, periodic CSI reports and/or scheduling request (SR) in a subframe.

In an example, a WTRU may receive a plurality of transport blocks over a set of a plurality of configured carriers, generate HARQ-ACK feedback for the plurality of transport blocks and determine a number of HARQ-ACK feedback bits to use for the HARQ-ACK feedback. Further, the WTRU may apply, to the HARQ-ACK feedback bits, Reed-Muller coding on a condition that the number of HARQ-ACK feedback bits is less than or equal to a threshold. The WTRU may then transmit the encoded HARQ-ACK feedback bits.

In addition, the WTRU may append cyclic redundancy check (CRC) bits onto the HARQ-ACK feedback bits on a condition that the number of HARQ-ACK feedback bits is greater than a threshold. Also, the WTRU may apply convolutional coding to the HARQ-ACK feedback bits and the CRC bits on a condition that the number of HARQ-ACK feedback bits is greater than a threshold. The WTRU may then transmit the encoded HARQ-ACK feedback bits and CRC bits.

Further, the WTRU may determine the number of HARQ-ACK feedback bits to use for the HARQ-ACK feedback based on a plurality of downlink assignments for carriers in the set of configured carriers. The set of configured carriers may include more than five configured carriers.

In another example, a WTRU may receive a plurality of transport blocks over a set of a plurality of configured carriers and generate HARQ-ACK feedback and CSI feedback for the plurality of transport blocks. The WTRU may then generate a feedback message that includes a number of HARQ-ACK feedback bits to use for the HARQ-ACK feedback and a number of CSI feedback bits to use for the CSI feedback. The WTRU may then determine a PUCCH format based on the number of HARQ-ACK feedback bits and the number of CSI feedback bits. In addition, the WTRU may then transmit the feedback message using the determined PUCCH format.

Further, the WTRU may determine the number of HARQ-ACK feedback bits to use for the HARQ-ACK feedback, the number of CSI feedback bits to use for the CSI feedback, or both, based on a plurality of downlink assignments for carriers in the set of configured carriers. In an example, the WTRU may select from four PUCCH formats.

In another example, a WTRU may receive a plurality of transport blocks over a plurality of configured carriers. The WTRU may generate HARQ-ACK feedback for the plurality of transport blocks, CSI feedback for at least one of the plurality of configured carriers, and a CRC. Further, the WTRU may generate a feedback message that includes a number of HARQ-ACK feedback bits for the HARQ-ACK feedback, a number of CSI feedback bits for the CSI feedback, and a number of CRC bits for the CRC. The WTRU may then determine a power to be used for a PUCCH transmission based on the number of HARQ-ACK feedback bits, the number of CSI feedback bits, and the number of CRC bits. Moreover, the WTRU may transmit the feedback message in the PUCCH transmission at the determined power.

In an example, the number of CRC bits may be based on the number of HARQ-ACK feedback bits and the number of CSI feedback bits. In a further example, the WTRU may generate a SR. Also, the feedback message may further include a number of SR bits for the SR. Moreover, the number of CRC bits may be based on the number of HARQ-ACK feedback bits, the number of CSI feedback bits and the number of SR bits.

In another example, the number of HARQ-ACK feedback bits for the HARQ-ACK feedback or the number of CSI feedback bits for the CSI feedback may be determined based on at least one of a number of transport blocks or a number of carriers in the plurality of configured carriers. Also, the number of HARQ-ACK feedback bits for the HARQ-ACK feedback or the number of CSI feedback bits for the CSI feedback may be determined based on a number of subframes over which the transport blocks are received. Further, the WTRU may transmit the feedback message in the PUCCH transmission at the determined power in a subframe.

In a further example, a WTRU may receive one or more PDSCH transmissions and each PDSCH transmission may be associated with DCI and a group of PDSCH transmissions. Further, the WTRU may determine a first group or a second group based on an indication received in DCI associated with at least one of the PDSCH transmissions. Then, the WTRU may generate HARQ-ACK feedback for data received in one or more PDSCH transmissions associated with the determined group. Moreover, the WTRU may transmit the HARQ-ACK feedback.

In an example, the DCI which includes the indication may schedule a plurality of PDSCH transmissions included in the determined group. In another example, the DCI which includes the indication may further include a first codepoint mapped to the first group or a second codepoint mapped to the second group. In an additional example, the DCI which includes the indication may further includes an uplink control information (UCI) request.

Also, all of the received one or more PDSCH transmissions may be received over the same carrier, in an example. In addition, the first group may be a first feedback group and the second group may be a second feedback group.

Moreover, the determination may be further based on a DCI format associated with the DCI which includes the indication. In another example, the DCI format may schedule the one or more PDSCH transmissions associated with the determined group. In a further example, the data may include user data. Further, a specific radio network temporary identifier (RNTI) may indicate the DCI which includes the indication, in an example.

BRIEF DESCRIPTION OF THE DRAWINGS

A more detailed understanding may be had from the following description, given by way of example in conjunction with the accompanying drawings wherein:

FIG. 10 is a system diagram of an example radio access network and an example core network that may be used within the communications system illustrated in FIG. 1A;

DETAILED DESCRIPTION

Figure 1A:
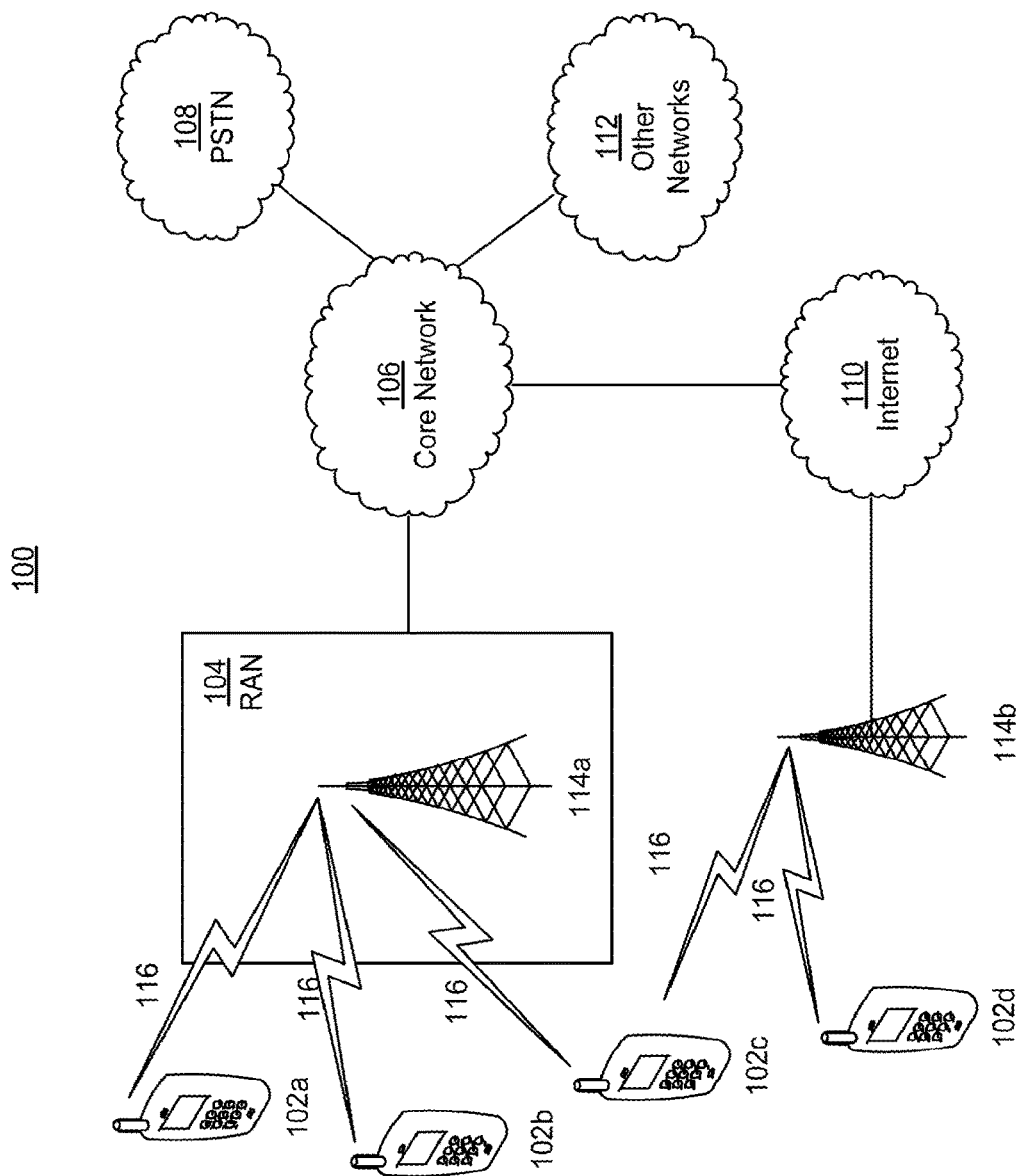
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
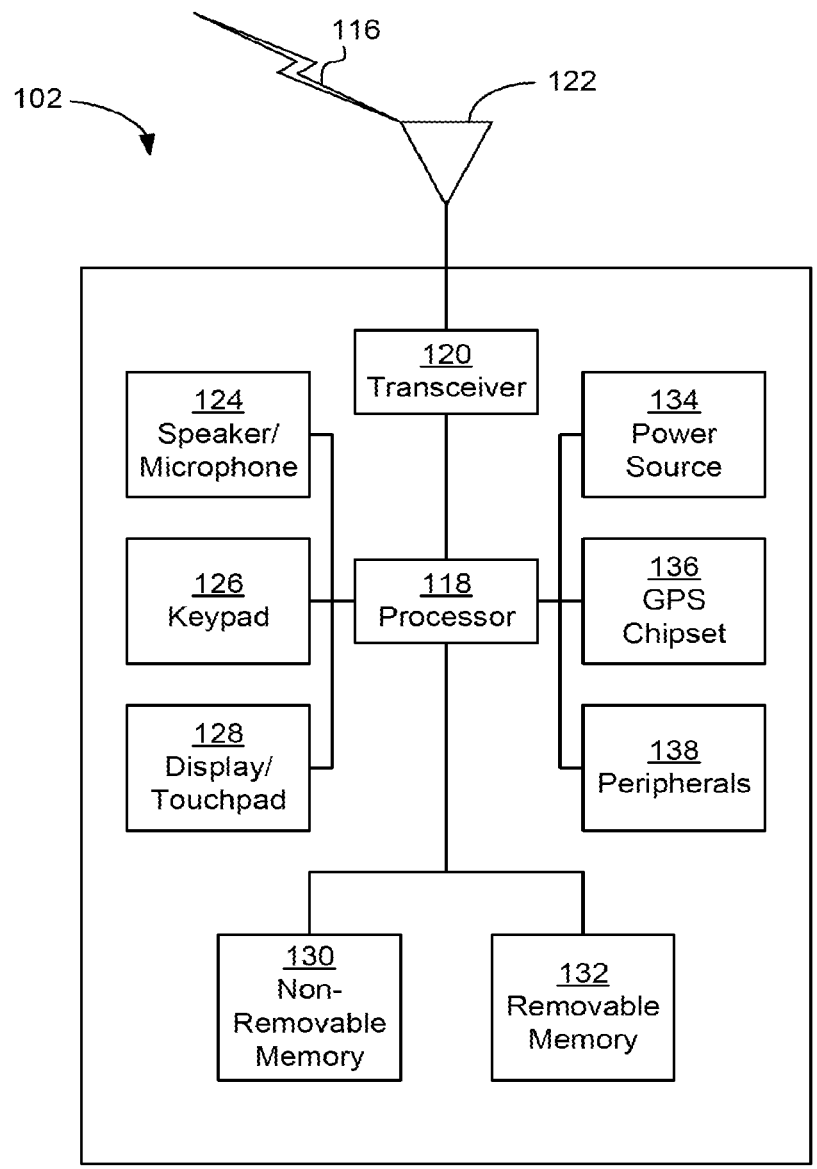
FIG. 1B is a system diagram of an example wireless transmit/receive unit (WTRU) that may be used within the communications system illustrated in FIG. 1A.
Figure 1C:
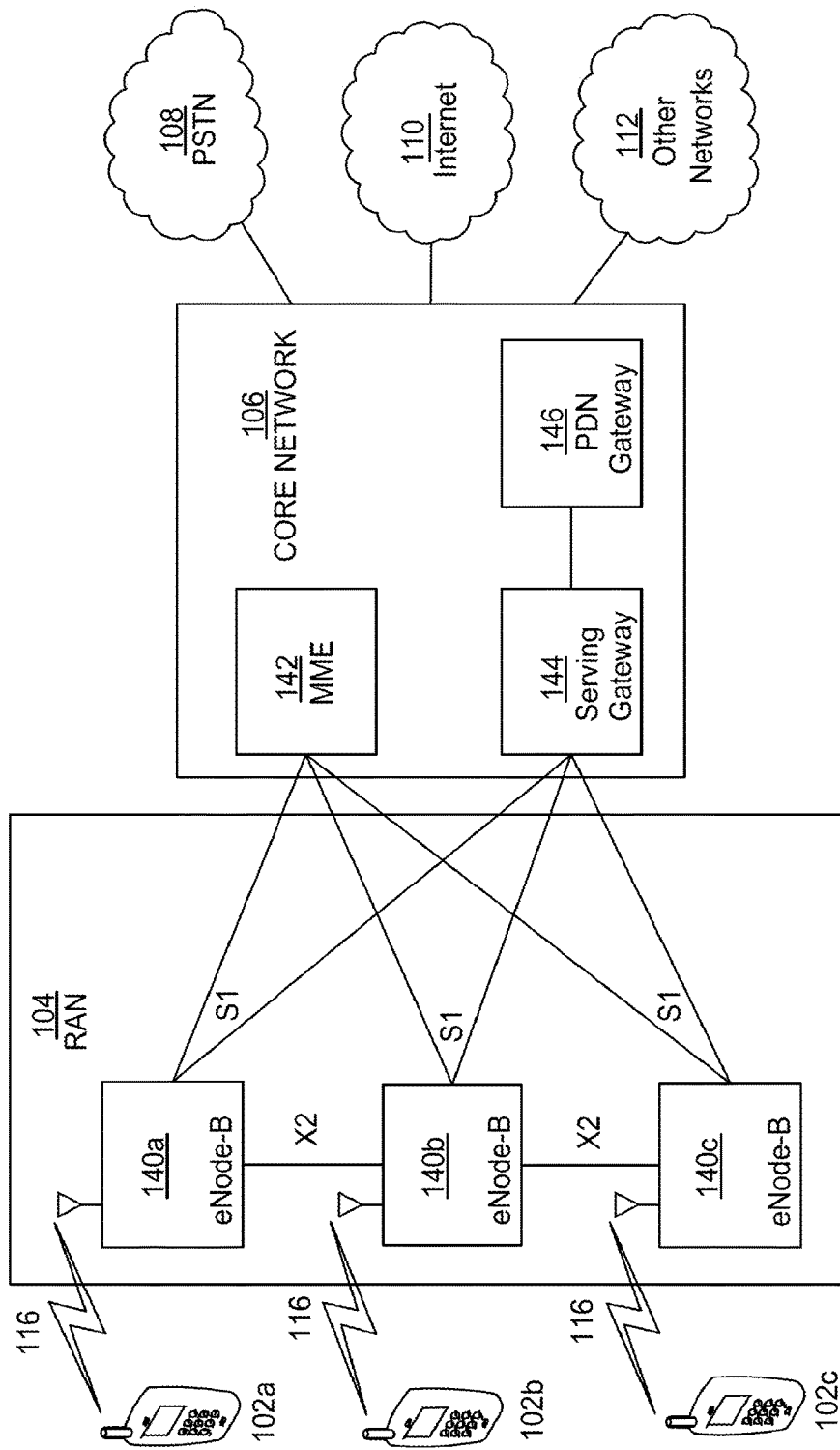

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 10 is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 10, the eNode-Bs 140a, 140b, 140c may communicate with one another over an X2 interface.

The core network 106 shown in FIG. 10 may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Carrier aggregation for LTE was introduced in $3^{rd}$ Generation Partnership Project (3GPP) Release 10. This feature allows a WTRU to transmit and receive on more than one carrier simultaneously, resulting in an increase of its peak data rate over the air interface. In an unmodified form of carrier aggregation, the maximum number of carriers that may be aggregated is five (5), for a maximum bandwidth of 100 megahertz (MHz).

Transmission of data in the downlink in LTE may be performed using the physical downlink shared channel (PDSCH). This physical channel supports hybrid automatic repeat request (HARQ) transmission, in which the receiver (at the WTRU) may combine successive transmissions of a transport block to increase the probability of successful decoding at each retransmission. The WTRU may report, for a given reception attempt of a transport block, that the reception has succeeded with an acknowledgement (ACK) or has not succeeded with a negative acknowledgement (NACK). In some cases the WTRU may also report that it did not detect that a transport block was transmitted, such as in discontinuous transmission (DTX). Such reporting may collectively be referred to as "HARQ-ACK feedback" herein. The result of a specific reception attempt of a transport block (ACK or NACK, or in certain solutions ACK, NACK or DTX) may be referred to as a "HARQ A/N report" herein.

When carrier aggregation is configured, up to 2 transport blocks may be received per carrier (or serving cell) and subframe on the PDSCH channel. In Frequency Division Duplex (FDD) mode, the WTRU may report 1 bit of HARQ-ACK feedback separately for each transport block where ACK is transmitted if the transport block was received successfully and NACK is transmitted otherwise. In Time Division Duplex (TDD) mode, in some configurations, the WTRU may report 1 bit of HARQ-ACK for each pair of transport blocks received in the same carrier and subframe (for example, spatially multiplexed) or 1 bit of HARQ-ACK for a set of transport blocks received in the same carrier and in a set of subframes, where ACK is transmitted if all transport blocks of a pair or set are received successfully and NACK is transmitted otherwise. Such a scheme, where the WTRU reports ACK on a condition that all of a set of more than one transport block is successfully received, and NACK otherwise, may be referred to as "A/N bundling". A/N bundling may be performed for transport blocks spatially multiplexed (spatial bundling), for transport blocks received in different subframes (time bundling) or for transport blocks received in different carriers or cells (frequency bundling).

In both modes, there is a fixed timing relationship between the reception of a transport block and the transmission of a HARQ-ACK bit dependent on the success or failure of the reception of this transport block. More specifically, in FDD mode a HARQ-ACK bit corresponding to a transport block received in subframe n may be transmitted in subframe n+4. In TDD mode, the timing relationship may depend on the subframe configuration and on the index of the subframe in which the transport block is received.

Transmission of HARQ-ACK bits in a subframe may be performed on either a Physical Uplink Control Channel (PUCCH) or a Physical Uplink Shared Channel (PUSCH) physical channel. PUCCH may be used when no PUSCH transmission is available in a subframe, or when the WTRU is configured to simultaneously transmit PUCCH and PUSCH.

PUCCH may occupy a single physical resource block (PRB) in each time slot of a subframe and may be transmitted according to one of a set of possible formats. When more than 4 HARQ-ACK bits need to be transmitted on PUCCH in a single subframe, the WTRU may need to be configured to use PUCCH format 3. PUCCH format 3 may be described as a Discrete Fourier Transform-Spread-Orthogonal Frequency Division Multiplexing (DFT-S-OFDM) transmission where each quadrature phase shift keying (QPSK)-modulated symbol occupies a single sub-carrier and is spread in the time domain using one of a set of orthogonal cover codes. In PUCCH format 3, each QPSK-modulated symbol may be spread over one time slot such that 48 coded bits may be accommodated in a subframe (2 time slots times 12 sub-carriers times 2 bits per symbol). Up to 10 HARQ-ACK bits (in FDD mode) or 20 HARQ-ACK bits (in TDD mode) may be multiplexed with up to 1 scheduling request (SR) bit to be encoded into those 48 coded bits.

Within a cell, up to 4 WTRUs may transmit mutually orthogonal PUCCH format 3 in the same resource block. However, the maximum number of WTRUs that may be configured to use the same resource block may be smaller when inter-cell interference is significant.

When HARQ-ACK bits in a subframe need to be transmitted over PUSCH, the corresponding modulated symbols may be mapped onto resource elements occupying a portion (or all) subcarriers in 4 time symbols adjacent to the time symbols used for the transmission of demodulation reference signals (DM-RSs) in the subframe. The number of resource may be determined based on the size of PUSCH allocation and a parameter configured such that the amount of energy available to HARQ-ACK is sufficient to ensure that an error performance target is met.

To enhance the carrier aggregation feature, it has been proposed to enable aggregation of up to 32 carriers. This enhancement may be challenging from the perspective of providing HARQ-ACK feedback since reusing the same solutions as in the legacy system may now require the transmission of up to 64 HARQ-ACK bits (for FDD mode)

or 128 HARQ-ACK bits (for TDD mode). This may create the following concerns. First, the maximum number of coded bits available in a PUCCH transmission (48) may be lower than the number of HARQ-ACK (and SR) information bits determined using the legacy solutions. Second, the amount of energy used for HARQ-ACK (and SR) transmission in PUSCH may become insufficient to ensure acceptable error performance.

It has also been proposed that the WTRU may be configured with PUCCH on one or more Secondary Cells (SCells). In such a case, the WTRU may need to determine whether to transmit some or all of the uplink control information (UCI) using a single transmission and, if so, whether to use a PUCCH transmission on a Primary Cell (PCell) (or Primary SCell (PSCell) if for the Secondary Cell Group (CG) (SCG)), a PUSCH transmission on a cell of the master cell group (MCG) (if available and UCI is associated with the MCG) or a PUSCH transmission on a cell of the SCG (if available and UCI is associated with the SCG).

Methods and solutions are disclosed herein for reducing HARQ-ACK payload, including the following. Conditional generation of a HARQ A/N report may be based on the satisfaction of one or more conditions, such as, for example, conditions regarding the Modulation and Coding Scheme (MCS) and/or reported Channel Quality Indicator (CQI). Also, selective partial bundling may be used where groups of transport blocks (TBs) for which bundling is applied are selected on a subframe basis to minimize unnecessary retransmissions. Further, the down-selection of acknowledgement reports may be used.

Methods and solutions are disclosed herein for increasing PUCCH payload, including the following. For example, methods and solutions are disclosed herein for the use of higher-order modulation, possibly on a subset of sub-carriers to implement unequal error protection. Also, methods and solutions are disclosed herein for the use of more than 1 resource block (RB), using new a DM-RS design allowing multiplexing with legacy formats while maintaining low cubic metric (CM). In addition, methods and solutions are disclosed herein for the use of spatial multiplexing, where the number of information bits on each layer may be dynamically selected. Further, the modulation symbols may be spread over fewer resource elements (REs) than in an unmodified approach, where the number of symbols may be dynamically selected.

Methods and solutions are disclosed herein for the efficient use of resources, including the following. Codebook properties may be dynamically determined, based on, for instance, downlink control signaling. Also, a codebook permutation may be selected to optimize decoding performance. In addition, multiple feedback groups may be transmitted and processed separately or jointly, and a feedback group indicator may be used to facilitate decoding. Further, resource selection and mapping, a power setting function of the PUCCH and/or the dynamic scheduling of UCI on PUCCH may be used. Also, an indication of index and/or counter for each downlink assignment may be used to enable a dynamic codebook as well as feedback compression.

Methods and solutions are disclosed herein for increasing UCI payload in the PUSCH, including the following. Modified transport block processing may be used when the number/proportion of REs in PUSCH exceeds a threshold.

Methods and solutions are disclosed herein for resource selection in case of multiple types of transmission in multiple cells. Also, methods and solutions are disclosed herein for the transmission of multiple periodic CSI reports in a subframe.

Methods and solutions are disclosed herein for a codebook determination, which may use an Acknowledgment/Negative Acknowledgement (A/N) resource indicator (ARI) for the determination of the final assignment, and the transmission of multiple CSI reports.

The following solutions address the problem of limited payload (or range) for the transmission of HARQ-ACK by allowing a reduction of the number of information bits used for HARQ-ACK.

In some solutions, the number of information bits generated for HARQ-ACK may be reduced by restricting the generation of a HARQ A/N report (or bit) for a given transport block only when at least one condition is satisfied. The at least one condition may be defined such that unnecessary retransmissions of a transport block by the network are minimized. Generally this may be achieved if the at least one condition is such that the A/N report is generated only when the probability of successful decoding is significant.

In legacy LTE systems, the WTRU may typically generate a HARQ A/N report when it receives a transmission on PDSCH and/or when it receives a downlink control information (DCI) that activates or deactivates a configured uplink grant or a configured downlink assignment.

In one method, the WTRU may perform further determination when generating a HARQ A/N report. The WTRU may generate a HARQ A/N report for a transmission associated with a specific carrier (or associated with a specific serving cell) of the WTRU's configuration, according to at least one of the following.

The WTRU may receive a DCI, such as a DCI characterized by at least one of the following: a DCI type, an indication inside the DCI, a Radio Network Temporary Identifier (RNTI) used for the successful decoding of the DCI, a search space associated with the received DCI, a location of the DCI in the search space, an aggregation level of the DCI, other DCI contents, or a combination thereof.

For DCI type, the WTRU may determine whether or not a HARQ A/N report is expected for a transmission as a function of the type (or format) of DCI associated with the transmission. For example, the WTRU may receive a DCI of a specific type (or format) and determine that a HARQ A/N report may not be generated. Such an association may be based on the DCI format itself. For example, the DCI may also carry the scheduling information for the concerned transmission. Such an association may be based on timing, such as for example, a DCI of a specific type (or format) received in the same subframe as DCI that schedules one or more transmissions in the concerned subframe. Such a type may include a DCI type that may possibly be used to provide "hints" in support of WTRU processing of downlink control signaling. Such DCI may indicate that no transmission is applicable for the concerned carrier in the given subframe. Alternatively, such DCI may indicate that the WTRU is not expected to generate HARQ A/N feedback for one or more carriers. Possibly, such DCI may indicate, for example, using a codepoint, a specific format and/or combination of carriers for which a HARQ A/N report is expected for the concerned interval (for example, a subframe). Further examples of such DCI are described herein. Similar to legacy systems, the WTRU may be required to generate HARQ A/N report for a DCI that activates or deactivates a configured grant and/or a configured downlink allocation, while other DCI formats may require additional rules to determine whether or not to generate a HARQ A/N report.

For indication inside the DCI, the WTRU may determine whether or not a HARQ A/N report is expected for a transmission as a function of the contents of a DCI associated with the transmission. For example, the WTRU may receive a DCI, for example, that schedules a PDSCH transmission. Such DCI may include an indication. The WTRU may determine from such indication whether or not a HARQ A/N report is expected for the concerned PDSCH transmission. Possibly, such DCI may indicate, for example, using a codepoint, a specific format and/or combination of carriers for which a HARQ A/N report is expected for the concerned interval (for example, subframe). The indication may consist of the value of a field included in the payload of the DCI, or of the value of a field used to mask a subset or all bits of the cyclic redundancy check (CRC). The field may consist, for instance, of a downlink assignment index (DAI) field, or of a dedicated field (HARQ A/N reporting indicator).

For RNTI used for the successful decoding of the DCI, the WTRU may determine whether or not a HARQ A/N report is expected for a transmission as a function of the RNTI used to successfully decode a DCI associated with the transmission. For example, the WTRU may be configured with a plurality of RNTIs. The WTRU may be configured such that the successful decoding of a DCI when using a given RNTI may indicate that a HARQ A/N report is not required for the associated transmission (or conversely, that a HARQ A/N report is required).

For search space associated with the received DCI, the WTRU may determine whether or not a HARQ A/N report is expected for a transmission as a function of the search space of the DCI associated with the transmission. For example, the WTRU may be expected to generate HARQ A/N report for a transmission associated with a DCI received in the Common Search Space (CSS) but possibly not for a DCI received in the WTRU-specific Search Space (or UE-specific Search Space (UESS)) and/or the WTRU may apply additional rules in the latter case. For example, the WTRU may be configured with a plurality of UESSs (or similar, for example, the UESS may be portioned) where reception of a DCI in a specific UESS (or portion thereof) may indicate that a HARQ A/N report is not expected while such may be expected for a different UESS (or portion thereof).

For location of the DCI in the search space, the WTRU may determine whether or not a HARQ A/N report is expected for a transmission as a function of a control channel element (CCE) of a DCI associated with the transmission. For example, such CCE may be the first CCE for the received DCI. For example, CCEs may be organized using a numerological sequence (for example, where the first CCE of a SS is #0, the second CCE corresponds to #2, and the like) such that the WTRU may determine that a HARQ A/N report may be expected when the first CCE of a DCI coincide with a specific CCE in the SS (for example, for even indices) but may not be expected for another CCE in the SS (for example, for odd indices).

For aggregation level of the DCI (for example, number of CCEs such as 1, 2, 4 or 8 CCEs), the WTRU may determine whether or not a HARQ A/N report is expected for a transmission as a function of the aggregation level (AL) of a DCI associated with the transmission. For example, the WTRU may be expected to generate a HARQ A/N report for a transmission associated with AL of 4 or more, while it may not be required otherwise.

For other DCI contents, for example, scheduling information and/or transmission characteristics may be used (as further described herein). In one method, the WTRU may use any of the above methods to determine if the successfully decoded DCI includes a UCI (or HARQ feedback only) request, such as described herein.

The WTRU may determine that the transmission is characterized according to at least one of the following: an identity of the associated HARQ process, a redundancy version, an initial transmission or retransmission for the concerned HARQ process, a type of scheduling for the transmission, timing associated with the transmission, scheduling parameters, a simultaneous downlink transmission and/or aggregation size of UCI, or a combination thereof.

For identity of the associated HARQ process, the WTRU may determine whether or not a HARQ A/N report is expected for a transmission as a function of the identity of the HARQ process associated with the transmission (or indicated in the DCI). For example, the WTRU may be configured such that it may not be expected to generate a HARQ A/N report for a subset of HARQ processes, while it may generate HARQ A/N report for other processes. For example, the WTRU may determine that a HARQ A/N report is always expected for a process configured with a semi-persistent assignment.

For redundancy version (e.g., 0, 2, 3, 1), the WTRU may determine whether or not a HARQ A/N report is expected for a transmission as a function of the redundancy version (RV) associated with the transmission. For example, the WTRU may generate a HARQ A/N report for RV=2, 3, 1 but not for RV=0.

For initial transmission or retransmission for the concerned HARQ process, the WTRU may determine whether or not a HARQ A/N report is expected for a transmission as a function of whether the transmission is the initial transmission for the HARQ process or not. For example, the WTRU may determine that it is expected to generate a HARQ A/N report for HARQ retransmissions only.

For type of scheduling for the transmission, the WTRU may determine whether or not a HARQ A/N report is expected for a transmission as a function of whether dynamic scheduling information was received for the transmission (for example, DCI on a Physical Downlink Control Channel (PDCCH) that provided transmission parameters) or whether the transmission is received using a configured assignment For example, the WTRU may determine that a HARQ A/N report may not be required for a transmission dynamically scheduled (for example, it may always be required for semi-persistent assignments), possibly making further determination in combination with other methods described herein.

For timing associated with the transmission (or with the transmission of the associated UCI), the WTRU may determine whether or not a HARQ A/N report is expected for a transmission as a function of the transmission time interval (TTI) (or subframe, or slot) associated with the downlink transmission. For example, the WTRU may be configured such that it may not be required to generate a HARQ A/N report for one or more subframes (for example, even frames) within a frame.

For scheduling parameters (for example, size of TBs, MCS, and the like), possibly in relation to another metric, such as channel quality, the WTRU may determine whether or not a HARQ A/N report is expected for a transmission as a function of the parameters associated with the transmission. For example, the WTRU may determine that a HARQ A/N report is required for a TBS larger than a specific value, and otherwise it may not be required. Similarly, MCS may be used as the determination factor. For example, the WTRU may determine that a HARQ A/N report may be optional if expected BLER is higher than a threshold. The WTRU may use a combination of the last reported CSI and one or more properties of the downlink transmission such as the MCS larger than a threshold function of a CQI and the transmission rank larger than rank indicator (RI).

For simultaneous downlink transmission(s) and/or aggregation size of UCI, the WTRU may determine whether or not a HARQ A/N report is expected for a transmission as a function of the number of payload bits, total sum for all transport blocks or any other aggregated metric associated with the time interval when the transmission satisfies a specific condition, e.g., is larger than X. The WTRU may perform a similar determination as a function of the aggregated size of the UCI, for example, the sum of the HARQ A/N bits expected according to the legacy behavior may exceed a certain value X bits.

A combination of the examples discussed may be used. For example, the WTRU may determine that it is configured such that HARQ A/N report for one (or more) specific HARQ process(es) is generated (possibly at least) upon reception of an explicit feedback request such as reception of a DCI(UCI) described herein, otherwise the WTRU may not generate a HARQ A/N report for the concerned process(es); such behavior may be combined with additional rules such that the WTRU may generate HARQ A/N report under other circumstances. For example, the WTRU may generate HARQ A/N report starting from the xth retransmission for the concerned HARQ process(es) and/or when the WTRU receives dynamic scheduling for uplink resources for UCI reporting such as described herein.

Methods described herein may be applicable as a function of the physical channel used for reporting. The WTRU may determine whether or not it may perform the above determination or if the legacy behavior for generation of a HARQ A/N report, as a function of the type of uplink transmission, may be used to convey the UCI. For example, the WTRU may use the legacy behavior when it determines that HARQ A/N reports may be transmitted using one (or more) PUSCH transmission(s). The WTRU may determine that some HARQ A/N reports may be optional when it determines that HARQ A/N reports may be transmitted using one (or more) PUCCH transmission(s). The WTRU may perform such determination as a function of the timing of concerned the uplink transmission.

Methods described herein may be applicable as a function of the carrier associated with the transmission. The WTRU may determine whether or not it may perform the above determination or if the legacy behavior for generation of a HARQ A/N report, as a function the type of carrier, may be associated with the downlink transmission. For example, the WTRU may use a first method for carrier(s) in a licensed band while it may be used a second method for carrier(s) in an unlicensed band. For example, the WTRU may generate a HARQ A/N report (or more generally, a UCI report) for HARQ processes (and/or for CSI) associated with an unlicensed band (for example, for LTE License-Assisted Access (LAA)) when it successfully receives a DCI that includes a UCI (or HARQ feedback only) request (such as described herein). In which case, for example, the WTRU may report the status of the concerned HARQ process(es) where such status may, for example, be determined at (and correspond to) the time of the reception of such request. Otherwise the WTRU may not necessarily generate the concerned UCI feedback (for example, other rules may apply). For example, the WTRU may not generate HARQ A/N report for every received transmission.

For any of the examples discussed herein, such transmission may be at least one of the following: a PDSCH and DCI of a specific type. The transmission may be a PDSCH transmission. The transmission may be a sidelink. The transmission may be a direct WTRU-to-WTRU transmission, for example, a physical sidelink shared channel (PSSCH) (for example, for data), a physical sidelink control channel (PSCCH) (for control), and/or a physical sidelink discovery channel (PSDCH) (for example, for discovery).

The transmission may be a DCI that modifies a semi-persistent downlink assignment or a semi-persistent uplink grant. The transmission may be a DCI(UCI), for example, that includes a UCI request and/or dynamic UCI scheduling information, for example, as described herein. The DCI may be any other DCI, for example, for which any of the above methods may be applied.

For any of the examples discussed herein, such transmission may be associated with a serving cell, which serving cell may be at least one of the following: type of serving cell of the WTRU's configuration, cell configuration, group of cells, state of the cell, and quality of the cell.

In an example, the serving cell may be the type of serving cell of the WTRU's configuration. For example, the cell may be a Secondary Cell (such as a SCell) of the WTRU's configuration such that conditional HARQ A/N reporting is applied to such transmission for such cell. For example, the WTRU may not apply conditional HARQ A/N reporting to any such transmission for a Primary Cell (such as a PCell) of the WTRU's configuration for a WTRU configured with carrier aggregation or for a WTRU configured with dual connectivity. For example, the WTRU may not apply conditional HARQ A/N reporting to any such transmission for a special cell of a secondary cell group (such as a PSCell) for a WTRU configured with dual connectivity.

In another example, the serving cell may be configured in a cell configuration. For example, the cell may be configured (such as by radio resource control (RRC), or by medium access control (MAC)) such that conditional HARQ A/N reporting is applied to such transmission for such cell.

Also, in an example, the serving cell may be part of a group of cells. For example, the cell may be part of a specific group of cells such that conditional HARQ A/N reporting is applied to such transmission for such cells such as a "HARQ A/N group." Such group may correspond to a secondary cell group (for example, a service continuity gateway (SCG)) for a WTRU configured with dual connectivity. Such group may correspond to a secondary timing advance group (for example, a secondary Timing Advance Group (sTAG)) for a WTRU configured with carrier aggregation.

In an additional example, the serving cell may be associated with a state of the cell. For example, the cell may be associated with a state for the purpose of controlling whether or not conditional HARQ A/N reporting is applied. The WTRU may modify such a state based on a number of events, for example, reception of L1 signaling or reception of L2/MAC control signaling that indicates a change in the state for the cell. For example, the cell may be in the deactivated state such that conditional HARQ A/N reporting is applied to uplink control signaling associated with the cell.

In a further example, the quality of the serving cell may be used. For example, the quality of the cell may be based on WTRU-measurements. For example, the WTRU may determine that the quality of the cell is below (or above) a certain threshold and, until the WTRU determines that the quality changes sufficiently significantly and possibly also for a sufficient amount of time, determine whether or not it may apply condition HARQ A/N reporting for such transmission for the cell. The WTRU may perform such determination only for cells for which it reports a measurement, for example, a channel quality indicator (CQI). The WTRU may perform such determination when it performs the transmission of such measurement for the concerned cell.

Additional control information may be located inside the uplink transmission that contains a UCI report. In one method, the WTRU may signal inside the uplink transmission whether or not non-legacy handling of HARQ A/N bits has been applied by, for example, transmitting one bit to indicate whether conditional HARQ A/N has been applied to the uplink control signaling, or it may append a CRC. For example, the WTRU may perform at least one of the following: concatenate one bit (one bit flag indication is added to the transmission); concatenate CRC (for example, a 3-bit CRC may be added to the transmission, whereby different methods may be associated with different CRC calculations); and use different resource/property of PUCCH.

In one method, the WTRU may use any of the above to associate priority to a HARQ A/N report for such transmission. The WTRU may additionally handle the information bit associated with the HARQ A/N report according to at least one of the following: the WTRU may drop the information bit, the WTRU may set the value of the information bit to a specific value, the WTRU may bundle the information bit with other information bits, the WTRU may encode the information bit with less protection, and the WTRU may transmit the information bit using a different physical layer channel.

Where the WTRU may drop the information bit, the WTRU may not, for example, transmit any HARQ A/N for a low priority transmission. In such case, the WTRU may select a different (possibly smaller) format if the resulting total number of HARQ A/N bits to transmit is suitable for the selected format. Alternatively, the WTRU may perform the uplink transmission of HARQ A/N signaling, if any, such that the eNode-B may interpret the absence of the concerned HARQ A/N bit as a NACK.

Where the WTRU may set the value of the information bit to a specific value (such as to NACK), the WTRU may use coding for the HARQ A/N bits such that no energy is used for HARQ NACK transmissions and the eNode-B may interpret the absence of HARQ A/N as a NACK.

Where the WTRU may bundle the information bit with other information bits (such as of similar priority), the WTRU may bundle, for example, a plurality of HARQ A/N information bits based on an activation state of the SCell associated with the transmission for which HARQ feedback was generated. For example, feedback for carriers of similar priority may be bundled together. Possibly, only for carriers associated with uplink control information of low priority.

Where the WTRU may encode the information bit with less protection, for example, the WTRU may do so in cases where unequal error protection is applied to transmission of information bits.

Where the WTRU may transmit the information bit using a different physical layer channel, the WTRU may transmit the information bits using a different physical layer channel than was used for transmission of bits of higher priority.

The solutions described in the above may also be used to determine whether the WTRU transmits HARQ A/N over a specific resource or channel. For example, in case the WTRU may determine that transmission over PUCCH or over a specific PUCCH resource takes place only if at least one HARQ A/N bit is transmitted based on one of the solutions.

In some examples discussed herein, selective partial bundling may be used. In some examples, the number of information bits generated for HARQ-ACK may be reduced by applying bundling for a subset of groups of transport blocks that may be dynamically selected to minimize the resulting number of unnecessary retransmissions.

More generally, a WTRU may apply a first solution for generating HARQ-ACK information bits on a first subset of groups of transport blocks, and a second solution on a second subset of transport blocks, where the first and second subsets of transport blocks are selected based on at least one criterion that may change dynamically. For example, the criterion may be that the number of correctly received transport blocks for which the WTRU does not indicate positive acknowledgment is minimized for a given number of HARQ-ACK information bits. The WTRU may generate additional HARQ-ACK information bits to indicate which groups belong to the first and second subsets, using for instance a combinatorial index.

An example for generating HARQ-ACK information bits on a group of transport blocks may include at least one of the following: no bundling, full bundling, and partial bundling. For no bundling, one bit may be generated for each transport block, where a first value ("ACK" or 1) is generated on a condition that the transport block was correctly received and a second value ("NACK" or 0) is generated on a condition that the transport block was not correctly received or not received at all. For full bundling, one bit may be generated for all transport blocks, where a first value ("ACK" or 1) is generated on a condition that all transport blocks were correctly received, and a second value ("NACK" or 0) otherwise. For partial bundling, one bit may be generated for each of a number of subsets of transport blocks of the group, where for each subset of transport blocks, a first value ("ACK" or 1) is generated on a condition that all transport blocks of the subset were correctly received, and a second value ("NACK" or 0) otherwise.

In the above, a subset and/or a group of transport blocks may be, for example, defined as transport blocks that may be received from a certain serving cell (or subset thereof), a certain subframe (or subset thereof), or combination thereof. The groups may be explicitly configured by higher layers, or implicitly derived from the configuration (for example, the group size may be set to a fixed value and groups may be defined from the order of configured serving cells of the configuration).

For example, a WTRU may be configured with 32 serving cells in FDD and receive up to 64 transport blocks in a subframe. One may define 8 groups of 8 transport blocks, each of which may correspond to the transport blocks that may be received from a set of 4 serving cells. For 2 of the 8 groups, HARQ-ACK information bits may be generated according to the "no bundling" solution while for the 6 remaining groups, HARQ-ACK information may be generated according to the "full bundling" solution, resulting in 16 bits plus 6 bits for all groups. In addition, 5 information bits may be generated to represent a combinatorial index of 28 possible combinations of 2 out of 8 groups for which the "no bundling" solution is utilized in this subframe. To select which 2 out of 8 groups the "no bundling" solution is used on, the WTRU may determine, for each group, the number of successfully received transport blocks with "NACK" generated if "full bundling" may be used. The WTRU may select the 2 groups that have the largest number of such successfully received transport blocks. For example, in a subframe the number of successfully received transport blocks may be as follows: 8 for groups 1, 4 and 8; 5 for group 2; 4 for group 3; 2 for groups 5, 6; and 0 for group 7.

In this case, the WTRU may select groups 2 and 3 for the "no bundling" solution and all other groups use "full bundling."

The selection of the groups for which a given bundling solution is used may be based on at least one of the following criteria. The selection of the groups may be based on the minimization of the number of correctly received transport blocks for which the WTRU does not indicate a positive acknowledgment in the subframe, as described herein. Also, the selection of the groups may be based on the presence or number of correctly received transport blocks for which the WTRU may not indicate a positive acknowledgment in a set of previous subframes for each group. In addition, the selection of the groups may be based on the number of times "ACK" was not reported for a successfully received transport block in a group. For example, the WTRU may use the "no bundling" solution for the group for which "NACK" may be reported otherwise and that has the largest value of this number, or for which this number may go above a threshold. Further, the selection of the groups may be based on an indication from physical layer or higher signaling of the bundling solution to be applied for a certain group. Such an indication may be contained in a field of PDCCH/evolved-PDCCH (E-PDCCH) containing a downlink (DL) assignment for a serving cell of the group, or in a PDCCH/E-PDCCH containing information about DL assignments in the subframe. This may allow the network to override selection of groups by the WTRU; whether the WTRU received a DL assignment from a specific serving cell of a group. Also, the selection of the groups may be based on a property of one of the PDSCH transmissions of the group. Further, the selection of the groups may be based on the DCI format used for scheduling a PDSCH transmission of a group.

In examples disclosed herein, when a bundling solution is used across a group of serving cells, the WTRU may determine if a DL assignment was missed in a serving cell from an indication in a PDCCH/E-PDCCH containing a DL assignment for another serving cell of the group. Such indication may include a number of DL assignments that have been transmitted in the group in this subframe. The WTRU may determine that a DL assignment was missed if the total number of correctly received DL assignments for the group in the subframe is lower that the indicated number, and accordingly report "nack" for the group.

In some examples, an indication of an index of cells or TBs that are ACKed may be used. Further, in some examples, a WTRU may be configured by higher layers to only use the PUCCH A/N (ACK/NACK) resources to report ACKs. In such an example, the lack of a feedback by the WTRU may be implied to represent a NACK at the eNode-B. TB and HARQ process may be used interchangeably.

In a PUCCH format that enables reporting of multiple transport block HARQ A/N bits (possibly from multiple cells), there may be a pre-determined location within a bit string for each possible TB HARQ A/N report. A WTRU may leave blank (or set to a pre-configured value) any bits that represent TB HARQ A/N for which a NACK may otherwise be transmitted.

In another example, there may be pre-configured locations within the bit string where a set of TB HARQ A/N reports may be located. Such a set of bit locations may be used to report subsets of ACKs for multiple TBs. For example, the HARQ A/N bit string reported in a PUCCH may be composed of sets of x bits each. Each set of x bits may be used to report HARQ A/N for n TBs. In this example, the WTRU may be pre-configured (possibly semi-statically) with a meaning for all the possible 2^x codepoints of the set of bits, where each codepoint may identify a different subset of TBs for which ACK may be assumed at the eNode-B. As a simple numerical example, the bit string reported in a PUCCH may be composed of 5 sets of 2 bits each. Each set of 2 bits may be used to report ACK for any of 3 TB. For example, the codepoint '00' may indicate no ACKs for any of the three TB, '01' may indicate ACK for a first TB, '10' may indicate ACK for a second TB and '11' may indicate ACK for a third TB. The meaning of each codepoint may be set semi-statically by the eNode-B and may also indicate a group of TBs being ACKed (for example, a codepoint may indicate that a first and a second TB are ACK).

In another example, there may not be pre-determined locations within the bit string for each TB HARQ A/N report. In such an example, there may be no need to reserve a spot within the bit string for TB HARQ A/N reports that are not indicating ACK. This may enable a greater number of possible TB HARQ A/N reports on average, given that capacity may not be wasted for TB HARQ A/N reports of NACK TBs.

In the case where pre-determined (and/or pre-configured) locations within a bit string of HARQ A/N reports are not used for each TB HARQ A/N, the WTRU may indicate to the eNode-B the TB for which an ACK is transmitted. A WTRU may be provided with a unique identifier (possibly a bit string) for each TB from all possible cells. The WTRU may report back the identifier as an ACK within a PUCCH. For example, for the case where a WTRU may have up to 64 TBS transmitted within a subframe, the WTRU may be provided with an identifier for each TB made up of 6 bits. In such a case, the HARQ A/N report may simply be for the WTRU to include the 6-bit strings of any TB for which an ACK is transmitted. In one example, the TB identifier may be provided when a WTRU is scheduled with a transport block. In another example, the WTRU may determine the TB identifier as a function of an identifier of the cell transmitting the TB (such as the cell identity (ID)) and a HARQ process ID.

In some examples presented herein, a WTRU may have multiple ACKs to transmit in a PUCCH resource. For solutions where each TB HARQ A/N is not configured with a specific bit location in the HARQ A/N bit string, there may be situations where more ACKs are required to be transmitted in a PUCCH instance than the PUCCH capacity allows. In such a situation, the WTRU may down-select the TBs for which ACK is to be fed back in any PUCCH instance. Any TB for which an ACK is not transmitted may be assumed to be a NACK at the eNode-B, possibly erroneously so.

The WTRU may indicate to the eNode-B that a PUCCH feedback does not include all the ACKs and down-selection was used by the WTRU. In another example, the WTRU may include an indication along with any ACK transmission to inform the eNode-B whether the ACK for that TB is relative to the most recently transmitted PDSCH or to a previous version. For example, the WTRU may only be able to transmit an ACK after a second retransmission, when in reality it was ACKed after the first retransmission. Indicating to the WTRU whether the ACK occurred for a previous retransmission and/or also possibly indicating for what retransmission the ACK occurred may enable the eNode-B with link adaptation.

The down-selection of ACKs to transmit may be done autonomously by the WTRU following some pre-configured rules. The WTRU may determine the subset of ACKs to transmit by at least one of: a priority list and a semi-statically configured set of rules.

The priority list may be pre-configured by the eNode-B and may be determined as a function of the TBs and/or SCells transmitting the TB. The WTRU may rank the ACKed TB and transmit ACK feedback for the first TB, assuming the PUCCH has capacity to transmit n ACKS in any instance. The priority ranking may be determined by the WTRU as a function of the content of the PDSCH. For example, PDSCH used for control plane transmissions (such as RRC reconfiguration messages) may have higher ACK reporting priority than that of PDSCH used for user plane transmissions. The priority ranking may be dependent on the type of scheduling used for the PDSCH. For example, cross-carrier scheduled PDSCH may have higher/lower priority than self-scheduled PDSCH. Or semi-persistently scheduled PDSCH may have higher/lower priority than single scheduled PDSCH.

A semi-statically configured set of rules may enable the WTRU to determine the TBs for which ACK may be transmitted in a PUCCH instance up to the allowed ACK capacity in any one instance. For example, report ACKs for ACKed processes who may have had the highest number of retransmissions. For example, the WTRU may order the TB ACK reporting priority in terms of number of retransmissions per HARQ process and feedback ACK for the n processes with highest number of retransmissions. For example, report ACKs for ACKed processes whose ACK reports were previously skipped. These may possibly be ordered by how many times an ACK report was skipped for a process (such as the most skips leading to highest ranking). For example, report ACKs for ACKed TBs with highest/lowest data rate, and/or highest/lowest MCS, and/or highest/lowest number of PRBs and/or, highest/lowest RI. For example, report ACKS for ACKed TBs transmitted with/without spatial multiplexing. The above rules may be used in any combination and the order that the rules may be followed may be pre-configured. For example, a first rule may be to report ACKs for ACKed processes whose ACKs were previously skipped. If fewer than n processes qualify, the PUCCH feedback may be further filled with ACKs for processes that fulfill another rule (such as processes with the highest number of retransmissions).

The priority lists and/or sets of rules may be semi-statically configured and may also depend on the timing of the PDSCH and/or PUCCH. There may be subsets of subframes such that in a first subset of subframes a first set of rules is used to down-select ACK feedback and in a second subset of subframes a second set of rules is used to down-select ACK feedback.

In a given subframe or group of subframes, the WTRU may determine a method for the generation of HARQ-ACK information according to at least one of the following: no bundling, wherein HARQ-ACK may include concatenated HARQ A/N reports in a pre-determined order; fixed bundling of HARQ A/N reports for determined subsets of transport blocks (such as in spatial, frequency and/or time domain); conditional HARQ A/N report generation as described herein; selective partial bundling as described herein; and down-selection of ACK transmissions as described herein.

The selection of a method for the generation of HARQ-ACK to apply in a particular subframe, and possibly of parameters thereof, may be determined according to at least one of the following: payload of HARQ-ACK information bits, maximum payload accommodated by the PUCCH format, maximum payload accommodated by the PUSCH transmission, and an indication from a physical layer, MAC, or RRC signaling.

Payload of HARQ-ACK information bits may be used to determine a method to apply in a particular subframe. The payload may be determined for either: the number of received transport blocks concerned by the HARQ-ACK transmission (based on received DL assignments) or the maximum number of transport blocks that may be received and concerned by the HARQ-ACK transmission (such as based on the maximum possible number of received DL assignments and maximum number of transport blocks for each assignment).

Maximum payload that may be accommodated by the PUCCH format configured to be use in this subframe on a condition that no PUSCH transmission takes place in the subframe may be used to determine a method to apply in a particular subframe. For example, the WTRU may select the method that generates a number of HARQ-ACK information less than the maximum.

Maximum payload that may be accommodated by the PUSCH transmission in this subframe may be used to determine a method to apply in a particular subframe, such that the number of REs required to transmit HARQ-ACK information does not exceed a threshold.

An indication from physical layer, MAC or RRC signaling may be used to determine a method to apply in a particular subframe. For example, a field from a PDCCH/E-PDCCH containing a downlink assignment, an uplink grant or containing information on a set of downlink assignments and uplink grants may be used to indicate how HARQ-ACK information may be generated or the maximum number of HARQ-ACK bits that may be generated.

The following solutions address the issue of insufficient maximum payload for UCI in PUCCH, including at least one of HARQ-ACK, channel state information (CSI) and SR. In an example, an the available number of coded bits in a PUCCH may be increased.

In some solutions, PUCCH payload may be increased by using high modulation order symbols, for example, using modulation order higher than that of QPSK such as 16-quadrature amplitude modulation (QAM), 64-QAM, 256-QAM, and the like.

As an example, the number of coded bits carried in a single 16-QAM symbol is 4 bits, which is twice as much compared to those of carried in a single legacy PUCCH (such as, PUCCH format 3) QPSK symbol. A legacy PUCCH format 3 payload may be encoded into 48 bits and then may be mapped into 24 QPSK symbols. As an example, if 16-QAM symbols may be used instead of QPSK, for the same number of symbols, such as, 24 symbols, the PUCCH may carry 4×24=96 coded bits, which in comparison may be twice as much of the maximum encoded bits of legacy PUCCH format 3 using QPSK modulation.

The WTRU may use different modulation orders for different symbols which may be mapped to different PUCCH REs.

The WTRU may use different modulation orders for different symbols which may be mapped to different subcarriers. For example, out of 12 subcarriers per PUCCH RB n subcarriers, such as, n=4, may carry QPSK modulated symbols and (12−n) subcarrier, such as, 8, may carry 16-QAM modulated symbols. The total number of coded bits for a PUCCH with two PRBs (assuming all SC-FDMA symbols within the same PRB may carry the same information) may be calculated as follows:

$$2\times[n\times2+(12-n)\times4]=96-2\times n \qquad \text{Equation (1)}$$

All symbols mapped to the same subcarrier within the same PUCCH PRB may be modulated using the same modulation order, for example, QPSK, 16-QAM, and the like.

A WTRU may use different encoders and/or may generate different sets of encoded bits. Different sets of encoded bits may be mapped to different sets of PUCCH symbols where each set of PUCCH symbols may be modulated using a different modulation technique, for example, QPSK, 16-QAM, and the like. As an example, two encoders may be used to encode the information bits to be carried in a single PUCCH PRB, which may be referred to as the "Encoder A" and "Encoder B". Each encoder may have a different set of information bits as the encoder input. The output of the Encoder A may be modulated using a certain modulation technique, for example, QPSK, and may be mapped to a certain number of PUCCH subcarriers, such as, 4 subcarriers. The output of Encoder B may be modulated using a different modulation technique, for example, 16-QAM, and may be mapped to a different set of PUCCH subcarriers, such as, 12−8=4 subcarriers. The total number of coded bits for a PUCCH with two PRBs (assuming all SC-FDMA symbols within the same PRB may carry the same information) may be calculated as 88, per the formula described earlier.

Each PUCCH encoder, for which the encoded bits may be mapped to different modulation orders/techniques, may have a different protection level and/or robustness against channel/decoding impairments. For example, the encoded bits which may be ultimately mapped to 16-QAM symbols, may have less robustness against the channel/decoding impairments compared to the encoded bits mapped to QPSK symbols.

The WTRU may have two or more different sets of information bits with the possibility for two or more different performance requirements. The two or more different sets of information bits may be encoded using two or more encoders and/or the encoded bits may be modulated by two or more modulation techniques, for example, QPSK, 16-QAM, and the like. The two or more sets of modulated symbols may be mapped to two or more sets of subcarriers and/or REs.

As an example, the WTRU may use HARQ ACK/NACK bundling to bundle the HARQ ACK/NACK bits of some of the component carriers and/or the WTRU may not bundle the HARQ ACK/NACK of some other component carriers. Since an error in the reception of the bundled HARQ ACK/NACK bit may impact the operation of more component carriers compared to that of the error in a non-bundled HARQ ACK/NACK bit, the WTRU may assign the bundled HARQ ACK/NACK bits to the encoder which may be ultimately mapped to the QPSK symbols, whereas the WTRU may assign the non-bundled HARQ ACK/NACK bits to the encoder which may be ultimately mapped to the 16-QAM symbols. Consequently, the bundled HARQ ACK/NACK bits may have a higher protection against channel/decoding impairments compared to non-bundled HARQ ACK/NACK bits.

The WTRU may determine a modulation scheme based on a number of coded bits that needs to be transmitted in a subframe. For example, assuming that the same spreading scheme and number of RBs as PUCCH format 3 would be used (i.e. 2 symbols per sub-carrier and 1 RB), the WTRU may transmit using QPSK if the required number of coded bits is 48 bits, and using 16-QAM if the required number of coded bits is 92 bits.

In some solutions, PUCCH payload may be increased by allocating more than 1 resource block to a single PUCCH resource. Such solutions may be referred to as "extended PUCCH" when described herein.

Figure 2:
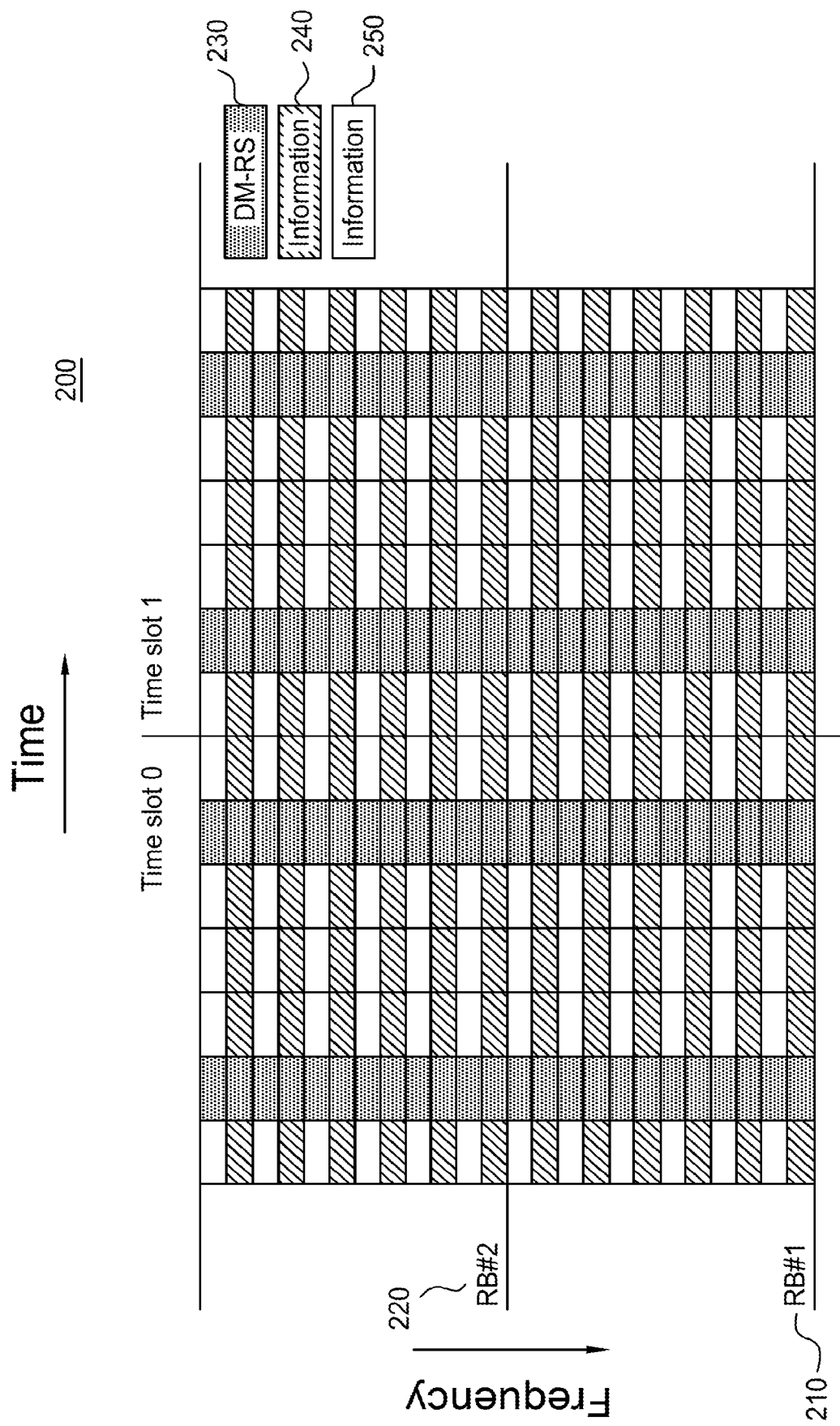
FIG. 2 is a diagram of an example of possible resource element (RE) mapping for extended Physical Uplink Control Channel (PUCCH) design utilizing two contiguous resource blocks (RBs)

FIG. 2 is a diagram of an example of possible RE mapping for extended PUCCH design utilizing two contiguous RBs. As shown in mapping 200, the time and frequency dimensions are represented by the horizontal and vertical axes, respectively. In an example in mapping 200, RB #1 210 and RB #2 220 are contiguous and transmitted in the same timeslot. This design may have the benefit of preserving single-carrier property of the uplink transmission. The number of REs available to carry uplink control information may essentially be doubled compared to a legacy transmission format utilizing a single RB.

In some solutions where PUCCH utilizes 2 RBs, the demodulation DM-RSs 230 may be transmitted in the same time symbols as in a legacy transmission format, such as PUCCH format 3. Information 240 and information 250 may also be transmitted. This is also illustrated in FIG. 2.

Different solutions may be envisioned for determining the sequence of the DM-RS, as described herein.

In a first solution, the DM-RS sequence for an extended PUCCH may be generated from base sequences $\bar{r}_{u,v}(n)$ of length 24 that are used in legacy systems for the DM-RS sequence of a PUSCH allocation of 2 RBs. Such base sequences may be different from the base sequences of length 12 used for PUCCH. The sequence itself may be defined as a cyclic shift of the base sequence $$r_{u,v}^{(\alpha)}(n)=e^{j\alpha n}\bar{r}_{u,v}(n) \qquad \text{Equation (2)}$$

The benefits of this solution may be that the DM-RS sequence has low peak-to-average power ratio and it allows multiplexing of other extended PUCCH resources using the same pair of RBs by use of different cyclic shifts of the same base sequence.

In a second solution, the DM-RS sequence for an extended PUCCH may be generated from two concatenated base sequences of length 12. In other words, the DM-RS sequence used for the extended PUCCH, $r_{u,v}^{(\alpha)ext}(n)$ may be expressed as:

$$r_{u1,u2,v}^{(\alpha)ext}(n)=e^{j\alpha n}\bar{r}_{u1,v}(n) \text{ for } 0\le n<12 \text{ and} \qquad \text{Equation (3)}$$

$$r_{u1,u2,v}^{(\alpha)ext}(n)=Ke^{j\alpha n}\bar{r}_{u2,v}(n) \text{ for } 12\le n<24, \qquad \text{Equation (4)}$$

where K may be a constant of unity amplitude, possibly dependent on the group-sequence numbers u1 and u2, configured such that the peak-to-average ratio of the DM-RS sequence is kept to a low value. The group-sequence numbers u1 and u2 may be set to the same value u. In this case, the extended DM-RS sequence in this solution may be equivalent to two concatenated DM-RS sequences of length 12 generated from the same base sequence with different cyclic shifts and a phase offset for the second sequence, $K=e^{j\beta}$, for example:

$$r_{u,v}^{(\alpha1,\alpha2)ext}(n)=e^{j\alpha1 n}\bar{r}_{u,v}(n) \text{ for } 0\le n<12 \qquad \text{Equation (5)}$$

and $$r_{u,v}^{(\alpha1,\alpha2)ext}(n)=e^{j\alpha2 n+j\beta}\bar{r}_{u,v}(n) \text{ for } 12\le n<24 \qquad \text{Equation (6)}$$

An example benefit of this solution may be that it allows multiplexing of an extended PUCCH resource with PUCCH format 3 resources on the same RBs, as long as the cyclic shift of the PUCCH format 3 on the first RB (or second RB) is different than (or respectively, and provided that orthogonality is also ensured for the resources carrying information. Multiplexing with other extended PUCCH resources on the same pair of RBs may also be possible with appropriate selection of cyclic shifts. The set of possible combinations of cyclic shifts and phase offset may be restricted such that desirable properties of the DM-RS sequence are maintained (for example, low peak-to-average power ratio). For example, utilizing a phase offset of pi/4 may result in a lower peak-to-average power ratio than using no phase offset.

In all the above solutions, the cyclic shifts used for DM-RS as well as the value of the phase offset may be a function of the time symbol in which DM-RS is transmitted.

Processing for the information carried by the extended PUCCH may be similar to processing used for PUCCH format 3 after modulation. Each modulated symbol may be spread over one sub-carrier and one time slot, resulting in a total of 48 modulated symbols or 96 coded bits if QPSK is used. This approach may have the benefit of enabling multiplexing of the extended PUCCH with PUCCH format 3 on a same RB, provided that orthogonality of DM-RS is also achieved.

The WTRU may determine a number of RBs based on a number of coded bits that needs to be transmitted in a subframe. For example, assuming that the same spreading and modulation schemes as PUCCH format 3 would be used (i.e. 2 symbols per sub-carrier and QPSK), the WTRU may transmit over 2 RBs if the required number of coded bits is 96 bits, and over 3 RBs if the required number of coded bits is 144 bits. When the number of RB's used for PUCCH is more than 1, the WTRU may apply transform precoding using one of the following solutions.

In a solution, the WTRU may apply discrete Fourier transform (DFT) over the set of all transmitted sub-carriers. In case the WTRU does not transmit over one of the RBs defined for the PUCCH transmission (according for instance to one of the solutions described in subsequent paragraphs) the DFT may not be applied to the corresponding sub-carriers. This solution may ensure that the output signal maintains as much as possible the desirable properties of SC-FDMA (e.g., low cubic metric).

In another solution, the WTRU may apply DFT separately over each RB. This solution may reduce receiver complexity in case there is uncertainty about whether the WTRU transmits or not on each RB.

In some solutions, PUCCH payload may be increased by spatial multiplexing. Such solutions may be referred to as "Rank-n PUCCH" herein, where n is the number of layers. With such solutions, for the same number of REs available for the transmission of information, the number of modulation symbols (and coded bits) may be increased by a factor n. The WTRU may transmit distinct DM-RS sequences for each antenna port corresponding to a layer.

In some solutions, each DM-RS sequence transmitted for each antenna port may be generated from a same base sequence of length 12 $\bar{r}_{u,v}(n)$. The DM-RS sequences $$r_{u,v}^{(\alpha)}(n) = e^{j\alpha n}\bar{r}_{u,v}(n)$$ Equation (7)

used in a time symbol may use a different cyclic shift for each antenna port p. This approach may have the benefit that multiplexing with legacy PUCCH format 3 transmissions in the same resource block may be achievable.

When spatial multiplexing is used, the channel quality as seen by the eNode-B receiver, may be different between the two antenna ports. In some solutions, the WTRU may therefore utilize different coding rates, coding schemes and/or modulation schemes between the two transmission layers to ensure that the error performance target of the at least one type of uplink control information is met with a transmission power as low as possible. For example, in the case of a Rank-2 PUCCH (n=2) at least one of the following solutions may be applied: processing k information bits of a given type, wherein k1 information bits are encoded, modulated and mapped on a first antenna port and k2 information bits are encoded, modulated and mapped on a second antenna port; encoding, modulating and mapping information bits of a first type on a first antenna port and of a second type of a second antenna port; determining a modulation order (for example, QPSK or 16-QAM) for use on each antenna port; determining a number of coded bits available on each antenna port; and determining coding scheme (for example, block code, convolutional code, turbo) for use on each antenna port.

For example, a WTRU may have to transmit k=30 bits of a given information type (such as HARQ-ACK) on a Rank-2 PUCCH. The WTRU may determine that k1=20 bits and k2=10 bits are encoded, modulated and mapped on the first and second antenna port respectively. The WTRU may also determine that QPSK is used on each antenna port, such that 48 coded bits are determined to be available for each antenna port. The WTRU may then encode 20 information bits using a coding rate of 20/48 to be mapped on the first antenna port and 10 information bits using a coding rate of 10/48 to be mapped on the second antenna port.

The WTRU may determine at least one of the above parameters using at least one of the following solutions. The WTRU may use an indication received from higher layer signaling. The WTRU may use an indication received from at least one field of DCI received on PDCCH or E-PDCCH. For example, the DCI may be a DCI containing one of the downlink assignments indicating a transport block for which HARQ-ACK is to be transmitted in the PUCCH transmission. The indication may include one or more of the following: an indication of a number or ratio of information bits to be encoded and mapped on each layer, (for example, a 2-bit field may indicate that the ratio is either one third, one half, two thirds or three fourth on the first antenna port and the remaining on the second antenna port (where the number of bits may be rounded up or down)); the A/N resource indicator (ARI) field, overloaded to include the above (the ARI field may be equivalent to, or may reuse the same resources as, a transmitter power control (TPC) field received in downlink control information for an SCell); an indication of whether QPSK or 16-QAM may be used for each antenna port; and an indication of the channel quality imbalance between the two antenna ports, expressed, for example, in terms of signal-to-interference ratio (SINR) ratio or difference in dB, or in terms of required difference between transmitted energy per information bit on each antenna port. The WTRU may use at least one resource index associated with the N-rank PUCCH, which may be indicated using an ARI field in combination with higher layer signaling. The number of information bits and modulation to for each antenna port may be configured as part of a resource configured by higher layers.

In examples, pre-coding may be used. In some examples, a WTRU equipped with more than one antenna port for the uplink may employ precoding similar to precoding applied to PUSCH. This may allow spatial multiplexing of PUCCH transmissions of multiple WTRU's on the same frequency and time resource. The pre-coding matrix applicable to the PUCCH transmission may be provided with downlink control signaling, such as in at least one PDCCH/E-PDCCH containing PDSCH assignments for which feedback is being provided in the subframe.

In some examples, DFT-S-OFDM with a smaller spreading factor may be used. In some solutions, PUCCH payload may be increased by spreading a modulation symbol over a smaller number of resource elements in a DFT-S-OFDM structure. For example, 48 modulation symbols spread over 3 time symbols may be mapped on the PUCCH and where the number of time symbols used for DM-RS is reduced to 2.

In some solutions, the time symbols used for DM-RS may be maintained in the same time symbols as in legacy PUCCH format 3 to maintain the possibility of multiplexing with legacy PUCCH transmissions of this format in the same RB. In such a framework several possibilities may be envisioned for the spreading of modulation symbols to time symbols over a subcarrier, such as but not limited to: 10 modulation symbols, each on a single time symbol (for example, no spreading); 5 modulation symbols, each spread over 2 time symbols; 4 modulation symbols, of which 2 may be spread over 3 time symbols and 2 over 2 time symbols; and 3 modulation symbols, of which 2 may be spread over 3 time symbols and 1 over 4 time symbols.

In case of a shortened PUCCH transmission, where the last time symbol is not available, the number of time symbols onto which a modulation symbol is spread may be reduced by 1 for one of the modulation symbols. The impacted modulation symbol is preferably one that is spread over a larger number of time symbols in a non-shortened PUCCH transmission.

The exact mapping of modulation symbols to time symbols within a sub-carrier (and therefore the spreading factor) may be parameterized to support a maximum payload value for PUCCH depending on this parameter value. The parameter may be derived from a PUCCH resource index or configured along with a PUCCH resource index.

Where separate coding is applied to a different subset of UCI bits, modulation symbols spread over a larger number of time symbols within the PUCCH (for example, the 2 modulation symbols per subcarrier which are spread over 3 time symbols instead of 2) may be used to carry coded bits for the UCI requiring higher robustness.

The WTRU may determine a spreading scheme based on a number of coded bits that needs to be transmitted in a subframe. For example, the WTRU may spread 5 modulation symbols per sub-carrier if the required number of coded bits is 120 bits, and 3 modulation symbols per sub-carrier if the required number of coded bits is 72 bits.

In an example, selection of codebook, resource and transmission format and parameters may be used. The WTRU may determine a PUCCH transmission format and possibly associated parameters for use in a particular subframe. A PUCCH transmission format may be characterized by a total number of coded bits and how the set of coded bits (or each subset of coded bits, if applicable) may be modulated, spread and mapped to physical resources (possibly including spatial multiplexing).

The PUCCH transmission format may include at least one of: a legacy PUCCH format such as 1, 1a, 1b, 2, 3, and the like; and a new PUCCH format supporting higher payload, such as a format based on one or a combination of techniques described in the above (higher order modulation, larger BW, spatial multiplexing or reduced spreading).

The selection of a format and associated parameters may be based on at least one of the following. The selection may be based on the number of information bits for different types of UCI to be transmitted on PUCCH (including multiple types of HARQ-ACK, CSI, SR). For example, the selection may be based on the presence or not of different types of UCI to be transmitted on PUCCH. Also, the selection may be based on an indication received from physical layer or higher layer signaling, such as a PDCCH/E-PDCCH containing a DL assignment or information about DL assignments. For example, the indication may contain a parameter indicating a number of modulation symbols to be mapped per subcarrier (or a spreading factor or set of spreading factors), a parameter indicating a modulation type (such as QPSK or 16QAM), and/or a parameter indicating a number of layers for the PUCCH transmission (rank). Further, the selection may be based on the method used for generating HARQ-ACK information bits to be transmitted in the PUCCH. In addition, the selection may be based on an indication received from physical layer or higher layer signaling of at least one codebook property, as described herein. The selection may also be based on a subset of feedback groups transmitted in a subframe, as described herein. Further, the selection may be based on dynamic scheduling of uplink resources for UCI feedback such as described herein, including methods related to UCI scheduling information as described herein, for example, using DCI(UCI) similar to that described herein.

In some solutions, the WTRU may determine all properties of a transmission format (including at least one of modulation, number of RBs, spreading, spatial multiplexing) based on a required number of coded bits and a mapping based on a pre-determined set of number of coded bits, number of information bits and/or subsets of feedback groups. For example, the WTRU may determine the transmission format based on a table similar to Table 1.

TABLE 1

| Number of coded bits | Number of RBs | Number of modulated symbols spread by sub-carrier | Modulation scheme |
|---|---|---|---|
| 48 | 1 | 2 | QPSK |
| 72 | 1 | 3 | QPSK |
| 96 | 2 | 2 | QPSK |
| 144 | 2 | 3 | QPSK |
| 192 | 2 | 2 | 16-QAM |
| 288 | 2 | 3 | 16-QAM |

In this example, the WTRU may determine a number of coded bits based for instance on a total number of information bits and a maximum coding rate, as described in subsequent paragraphs. For example, if the WTRU determines that the required number of coded bits is 144, the WTRU may employ QPSK modulation on the coded bits, spread the modulated symbols such that 3 symbols are spread over each sub-carrier, and map the resulting signal over 2 RBs.

In some solutions, the WTRU may select some properties of the transmission format based on a dynamic indication, such as receiving an ARI or another field from PDCCH/E-PDCCH. For example, a resource indicated by a received ARI may have 1 RB. If the required number of coded bits is 96 bits, the WTRU may determine that the spreading should be such that 4 modulation symbols are spread per sub-carrier, allowing for 96 coded bits in the RB. In case the resource indicated by the received ARI would have 2 RBs, the WTRU may determine that the spreading should be such that 2 modulation symbols are spread per sub-carrier, allowing for 96 coded bits in 2 RBs. Further examples of such dynamic aspects are described herein.

In an example, a dynamic determination of codebook properties may be used. In some solutions, the WTRU may determine at least one property of the set of information bits for HARQ feedback and possibly other UCI (e.g., the codebook) based on semi-static and/or dynamic aspects. The solutions may allow minimization of the amount of resources used for the transmission of such information. Further examples of such dynamic aspects are described herein.

By extension, the solutions described below may also be used to determine a PUCCH format, a PUCCH resource or a power control method that may be associated with a codebook property (such as the codebook size). For example, the WTRU may determine that a first PUCCH format (and/or power control method) is used if the codebook size is smaller than a first value and that a second PUCCH format is used if the codebook size is larger than or equal to a first value but smaller than a second value, and so on.

At least one of the following codebook properties may be determined. The number of information bits of the codebook may be determined. The order of the information bits of the codebook, for example in terms of which transport block(s) of which cell(s) or cell group(s) are mapped to a given position of the codebook, may be determined. The interpretation of each information bit (or set thereof) may be determined, such as whether the bit(s) represents: the ACK or NACK outcome of the decoding of a transport block received on a specific cell, cell group, and/or subframe; and/or an indication of cell(s) or cell group(s) or subframe(s) over which bundling is applied or not. A source coding scheme that may be applied (e.g., Huffmann encoding) may be determined. A channel coding scheme applied to the codebook (e.g., Reed-Muller, turbo or convolutional) may be determined.

Figure 3:
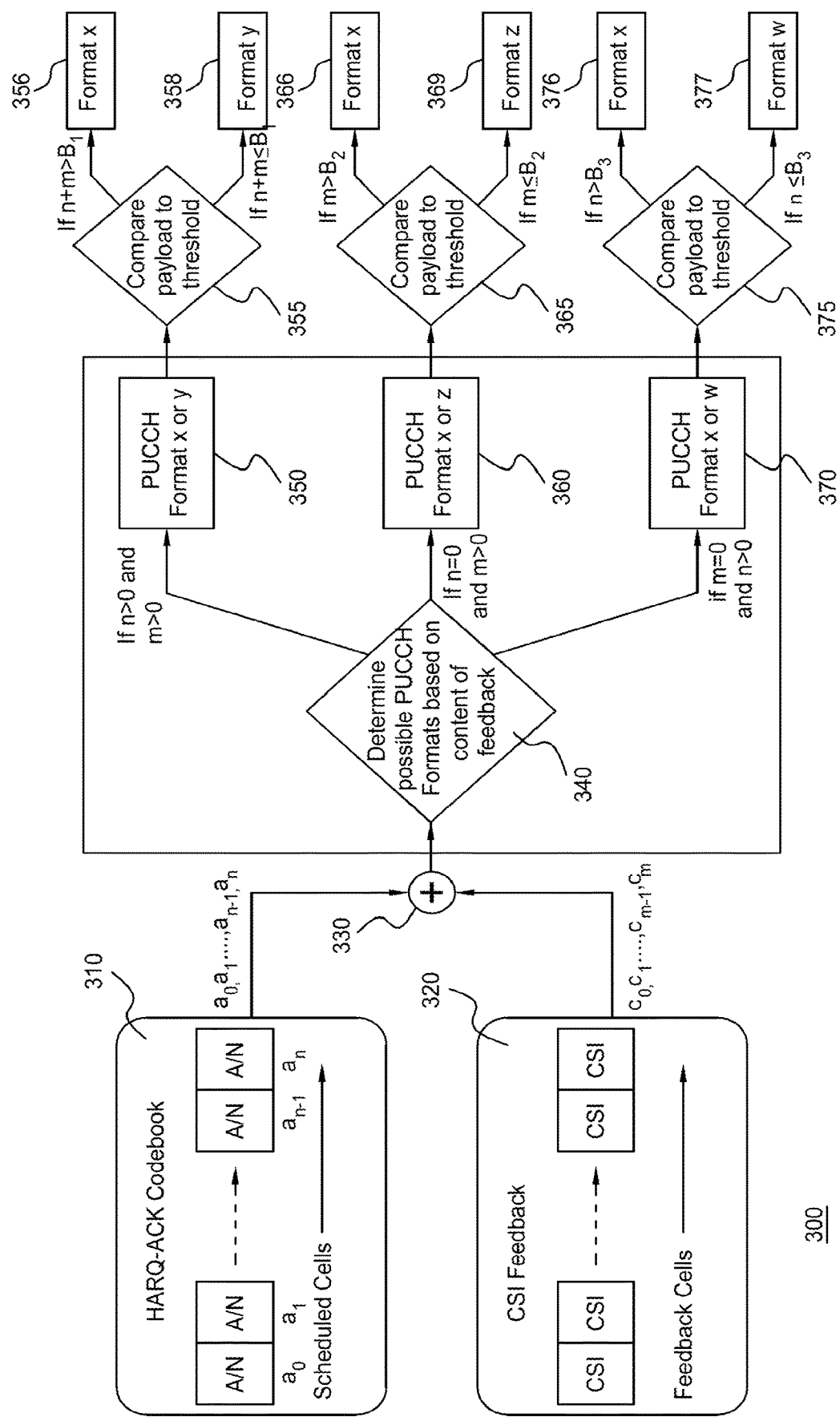
FIG. 3 is a diagram of an example selection process for a PUCCH format based on the size and type of feedback.

FIG. 3 is a diagram of an example selection process for a PUCCH format based on the size and type of feedback. In an example shown in process 300, a WTRU may receive a plurality of transport blocks over a set of a plurality of configured carriers and generate HARQ-ACK feedback 310 and CSI feedback 320 for the plurality of transport blocks. Further, the number of information bits needed for HARQ-ACK feedback 310, which may be represented by n, and the number of information bits needed for CSI feedback 320, which may be represented by m, may be combined (e.g., concatenated) by the WTRU 330. The WTRU may generate a feedback message that includes the number of HARQ-ACK feedback bits to use for the HARQ-ACK feedback and the number of CSI feedback bits to use for the CSI feedback. The WTRU may then determine the possible PUCCH format based on the content of the feedback 340. For example, this PUCCH format determination may be made based on the number of HARQ-ACK feedback bits and the number of CSI feedback bits. The WTRU may transmit the feedback message using the determined PUCCH format.

For example, if HARQ-ACK feedback is present and therefore n>0 and if CSI feedback is present and therefore m>0, then a first PUCCH format, such as PUCCH format x, or a second PUCCH format, such as PUCCH format y, may be selected 350. Also, if HARQ-ACK feedback is not present and therefore n=0 and only CSI feedback is present and therefore m>0, then PUCCH format x or a third PUCCH format, such as PUCCH format z, may be selected 360. Further, if HARQ-ACK feedback is present and therefore n>0 and if CSI feedback is not present and therefore m=0, then PUCCH format x or a fourth PUCCH format, such as PUCCH format w may be selected 370.

In the case that PUCCH format x or PUCCH format y is selected 350, the WTRU may then compare the number of information bits of the feedback payload to a first threshold 355, such as $B_1$. If the feedback payload is greater than the first threshold and therefore $n+m>B_1$, then PUCCH format x may be selected 356. Further, if the feedback payload is less than or equal to the first threshold and therefore $n+m\leq B_1$, then PUCCH format y may be selected 358. The WTRU may transmit the feedback message using the determined PUCCH format.

In the case that PUCCH format x or PUCCH format z is selected 360, the WTRU may then compare the number of information bits of the feedback payload to a second threshold 365, such as $B_2$. If the feedback payload is greater than the second threshold and therefore $m>B_2$, then PUCCH format x may be selected 366. Further, if the feedback payload is less than or equal to the second threshold and therefore $m\leq B_2$, then PUCCH format z may be selected 369. The WTRU may transmit the feedback message using the determined PUCCH format.

In the case that PUCCH format x or PUCCH format w is selected 370, the WTRU may then compare the number of information bits of the feedback payload to a third threshold 375, such as $B_3$. If the feedback payload is greater than the third threshold and therefore $n>B_3$, then PUCCH format x may be selected 376. Further, if the feedback payload is less than or equal to the third threshold and therefore $n\leq B_3$, then PUCCH format w may be selected 377. The WTRU may transmit the feedback message using the determined PUCCH format.

A codebook property may be dependent at least on semi-static (or static) information, such as a number of configured carriers (or cells), a subframe configuration, a grouping of cells in cell groups, a number of transport blocks that may be received in a given cell, a transmission mode used in a given cell, and a HARQ feedback scheme configured to be utilized in a cell or group of cells (such as whether bundling within or across subframes or cells is applied, or whether a HARQ feedback solution as described earlier is applied).

The WTRU may also determine a codebook property as a function of information that may change more dynamically, such as: the activation state of a cell or a cell group; whether radio link problems or radio link failure occurred for a cell group or was reported for a cell group; whether PDSCH is known to not have been transmitted from the network for a cell or a group of cells, or alternatively known to have been transmitted from the network; the dynamic subframe configuration (uplink (UL) or DL) in a cell; and DL control information received in a subframe.

For example, the WTRU may determine that a codebook only includes HARQ feedback for cells or groups of cells that are in an activated state or for which radio link failure was not reported. The WTRU may also determine that a codebook only includes HARQ feedback for cells, groups of cells or subframes from which the WTRU determines that PDSCH may have been transmitted. In this case the WTRU may determine the codebook size and the bit position(s) accordingly. For example, in case of 10 configured cells and 2 transport blocks per cell, if the WTRU determines that PDSCH may have been transmitted from cells 2, 3 and 6 only, the first two bits may correspond to HARQ feedback for cell 2, the two next bits may corresponding to HARQ feedback for cell 3, and so on for a codebook size of 6 bits.

The WTRU may make the determination that PDSCH may have been transmitted by using one of the following solutions. The WTRU may receive an indication of the cells, cell groups, transport blocks and/or subframes in which PDSCH may be transmitted from downlink control signaling included in PDCCH or E-PDCCH. The indication may consist of a field of which each possible value indicates a subset of cells, cell groups and/or subframes in which PDSCH may be transmitted (or may not be transmitted). The subset associated with each value may be predetermined or configured by higher layers. The subset may also be a function of the cell or cell group in which the signaling is received, or of the cell(s) or cell group(s) indicated in the same PDCCH or E-PDCCH in which the field is contained.

For example, if the field size is two bits, the value "00" may indicate that PDSCH may be received only in the cell(s) or cell group(s) for which PDSCH is scheduled in this PDCCH or E-PDCCH; the value "11" may indicate that PDSCH may be received in any configured cell or cell group; the value "01" may indicate that PDSCH may be received in a first set of cell groups configured by higher layers, and the value "10" may indicate that PDSCH may be received in a second set of cell groups configured by higher layers.

In another example, the cell index of one (or more) serving cell where PDSCH is transmitted may be used in combination with the indication value to determine the codebook. In this example, every DCI with a downlink assignment may transmit the same indication. The indication value may be mapped to different sets of cells and/or carriers and/or transport blocks for which a WTRU may be expected to feedback A/N. The determination of the appropriate set based on the indication, may be a function of the serving cell ID of at least one cell where a PDSCH is transmitted.

Table 2 provides an example of a relationship between an indication and sets of cells for which a WTRU may report A/N, as a function of the serving cell. Basically, the WTRU may determine the appropriate set as a function of the indication and that of the set of which at least one serving cell where a PDSCH is transmitted.

TABLE 2

| Index Value | Set of Cells for Which to Report HARQ A/N Feedback |
|---|---|
| 000 | All cells |
| 001 | Select the set that includes at least one cell(s) where PDSCH is scheduled among: {1, 2, 3, 4,5, 6, 7, 8}, {9, 10, 11, 12, 13, 14, 15, 16}, {17, 18, 19, 20, 21, 22, 23, 24}, {25, 26, 27, 28, 29, 30, 31, 32} |
| 010 | Select the set that includes at least one cell(s) where PDSCH is scheduled among: {1, 2, 3, 4, 5, 6, 7, 8, 9, 10, 11, 12, 13, 14, 15, 16}, {17, 18, 19, 20, 21, 22, 23, 24, 25, 26, 27, 28, 29, 30, 31, 32} |
| 011 | Select the set that includes at least one cell(s) where PDSCH is scheduled among: {1, 2, 3, 4, 5, 6, 7, 8, 25, 26, 27, 28, 29, 30, 31, 32}, {9, 10, 11, 12, 13, 14, 15, 16, 17, 18, 19, 20, 21, 22, 23, 24} |
| 100 | Select the set that includes at least one cell(s) where PDSCH is scheduled among: {1, 2, 3, 4, 5, 6, 7, 8, 17, 18, 19, 20, 21, 22, 23, 24}, {9, 10, 11, 12, 13, 14, 15, 16, 25, 26, 27, 28, 29, 30, 31, 32} |
| 101 | {1, 2, 3, 4, 5, 6, 7, 8, 9, 10, 11, 12, 13, 14, 15, 16, 17, 18, 19, 20, 21, 22, 23, 24} |
| 110 | {1, 2, 3, 4, 5, 6, 7, 8, 9, 10, 11, 12, 13, 14, 15, 16, 25, 26, 27, 28, 29, 30, 31, 32} |
| 111 | (1, 2, 3, 4, 5, 6, 7, 8, 17, 18, 19, 20, 21, 22, 23, 24, 25, 26, 27, 28, 29, 30, 31, 32} |

In case HARQ-ACK is to be reported for more than 1 subframe (e.g., in case of TDD), in one solution, the indication may represent the entire codebook over all subframes and cells regardless of the subframe in which it is received. Alternatively, the indication may represent the portion of the codebook corresponding to the subframe in which it is received. Alternatively, the indication may represent the portion of the codebook corresponding to subframe(s) up to and including the subframe in which it is received. For example, the indication may represent the a set of cell(s) or cell group(s) where PDSCH may be received in any subframe up to and including the subframe in which the indication is received.

The meaning of an indication (e.g., the set of transport blocks and/or cells and/or carriers and/or subframes for which a WTRU is expected to feedback HARQ A/N) may depend on other, possibly implicit, factors. For example, a WTRU may receive a specific codepoint or bitmap in an indication, and the WTRU may map such indication to a different codebook depending on at least one of the following. The WTRU may map such an indication to a different codebook depending on a timing of the transmission of the indication. For example, the subframe number may be used in conjunction with the indication. In another example, the specific subframe of a set of subframes for which feedback is reported in a specific subframe (in TDD) may be used. The WTRU may also map such an indication to a different codebook depending on another parameter of a DCI including the indication. For example, a combination of a TPC command and a new indication may be used. In another example, a parameter of the search space (e.g., whether it is common search space or WTRU-specific search space, or the CCE of the search space) of a DCI may be used in combination with the indication value. Further, the WTRU may also map such an indication to a different codebook depending on the PUCCH format and/or resources indicated in a downlink assignment.

In the above, the indication may be contained in a subset or all downlink assignments. The indication may also be contained in one or more PDCCH/E-PDCCH (or DCI(s)) dedicated to the provision of scheduling information for UCI as described herein.

In another example, the network may indicate which pre-configured group(s) of carriers contain at least one downlink assignment. Thus, the number of NACK bits corresponding to non-scheduled carriers (the "known" NACKS) may be reduced when there is no downlink assignment scheduled in certain groups of carriers. The size of the codebook can therefore be dramatically reduced, although it may still contain a (smaller) number of NACKS from non-scheduled carriers. The reduction of the size of the codebook improves not only performance from a power perspective but also PUCCH resource usage.

Another example is illustrated in Table 3 for a WTRU configured with 32 carriers. In this example, one of the codepoints of the indicator (00) may indicate "all carriers" to allow the WTRU be scheduled on all carriers. Another codepoint (01) may indicate 4 disjoint groups of 8 carriers. The specific group to select may be determined based on which carriers the assignments are received for. The two other codepoints (10) and (11) may indicate different groups of 16 carriers, or possibly groups where the order of carriers is modified as in Option 1. The exact mapping may be configured by higher layers to maximize scheduling flexibility and performance. Additional flexibility may also be obtained using a field with more than 2 bits. One possibility to minimize additional overhead may be to use a single field for ARI and Codebook Indicator.

TABLE 3

| Codebook Indicator Value | Set of Carriers for Which to Report HARQ A/N Feedback |
| --- | --- |
| 00 | All carriers |
| 01 | {1, 2, 3, 4, 5, 6, 7, 8} or {9, 10, 11, 12, 13, 14, 15, 16} or (17, 18, 19, 20, 21, 22, 23, 24} or {25, 26, 27, 28, 29, 30, 31, 32} |
| 10 | {1, 2, 3, 4, 5, 6, 7, 8, 9, 10, 11, 12, 13, 14, 15, 16} or (17, 18, 19, 20, 21, 22, 23, 24, 25, 26, 27, 28, 29, 30, 31, 32} |
| 11 | {1, 2, 3, 4, 5, 6, 7, 8, 25, 26, 27, 28, 29, 30, 31, 32} or {9, 10, 11, 12, 13, 14, 15, 16, 17, 18, 19, 20, 21, 22, 23, 24} |

In an example, not all carriers of an indicated group may need to be scheduled. The WTRU may indicate "NACK" when no DL assignment is detected for a carrier included in the indicated group.

Figure 4:
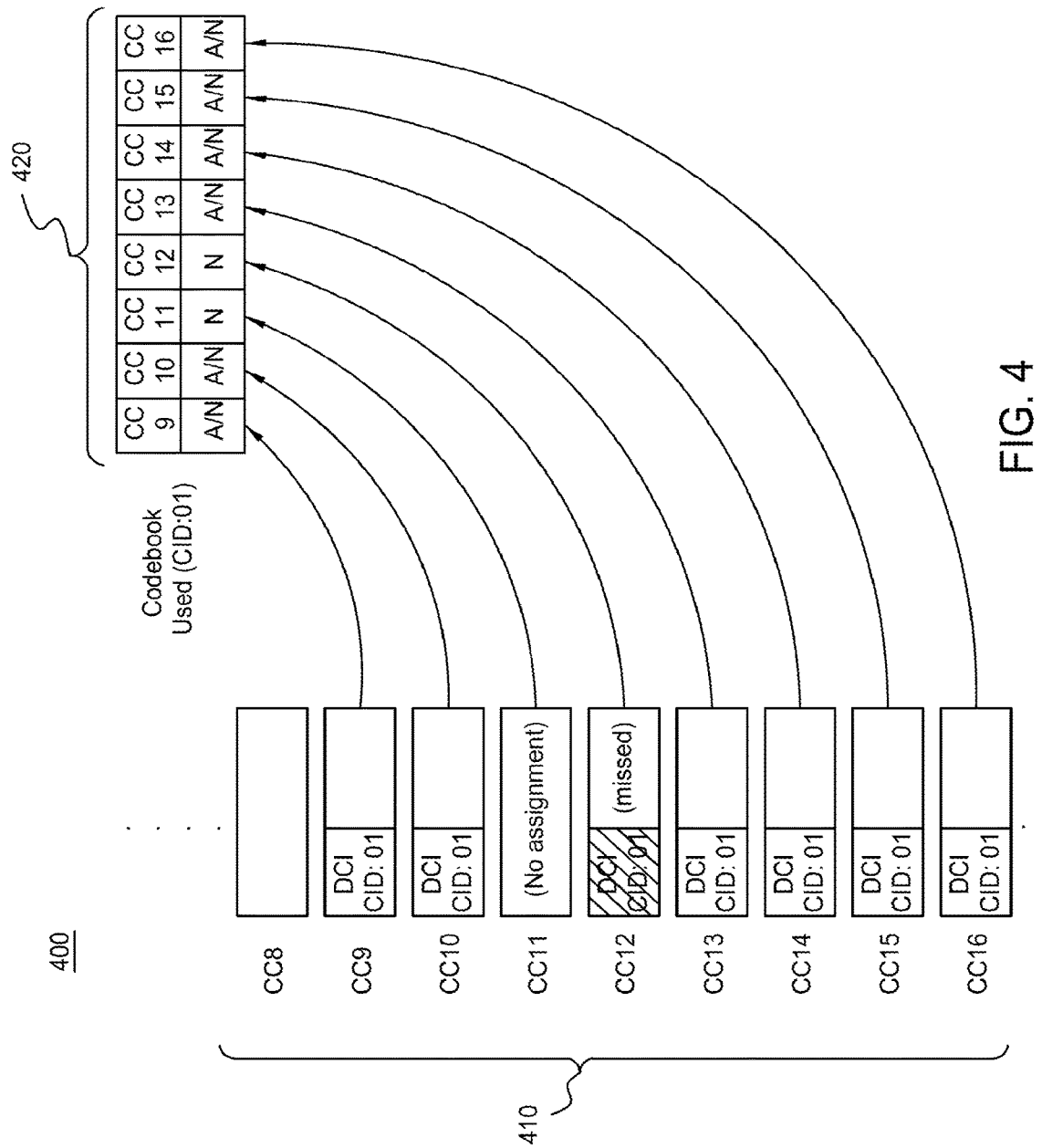
FIG. 4 is a diagram of an example of a hybrid automatic repeat request (HARQ) acknowledgment/negative acknowledgement (A/N) codebook determination.

FIG. 4 is a diagram of an example of a HARQ A/N codebook determination. In an example shown in diagram 400, the WTRU may receive downlink assignments for a sub-set of carriers within a set of carriers 410. For example, the WTRU may receive downlink assignments for the sub-set of carriers 9, 10, 13, 14, 15 and 16 with codebook indicator "01" in every DL assignment. The WTRU may miss DL assignment for carrier 12. The WTRU may not receive an assignment for carrier 11, which may have no assignment. The WTRU may use the codebook carrying HARQ A/N for carriers 420, such as carriers {9, 10, 11, 12, 13, 14, 15, 16}, and include NACK for carriers 11 and 12.

An indication may include at least one downlink assignment index (DAI) received as part of downlink control information associated with each PDSCH transmission. In this case, the WTRU may order the received PDSCH for each cell and subframe according to a pre-determined rule (for example, by cell index first and subframe second, or vice-versa). The WTRU may include HARQ A/N bits in the codebook for each received PDSCH (unless it was determined that HARQ A/N should not be included based on previously described solutions), and include HARQ A/N bits (with value "NACK") for each PDSCH determined to be missing based on the difference between consecutive DAI values in the sequence. For example, the number of missing PDSCH may be determined to be (N−1) mod M where N is the difference between consecutive DAI values in the sequence and M is the number of possible DAI values.

An indication may include a field received as part of downlink control information associated with at least one PDSCH transmission. The field may indicate the final downlink assignment of a group of downlink assignments, possibly assigned in or for a specific subframe. One value of the field (for example, '0') may indicate that the assignment is not the final assignment, and another value of the field (for example, '1') may indicate that the assignment is the final assignment of the group and/or subframe and/or component carrier. This may enable the WTRU to know when to stop blind detection in a subframe and also to know if it has detected the final assignment.

In some solutions, the indication associated with the final (or last) assignment may be derived from the value of a field that may also be used to indicate other types of information. For example, the indication may be derived from at least one value of the ARI and/or of the TPC command for the PUCCH received in one or more PDCCH/E-PDCCH(s), or from at least one value of a PUCCH format indicator, according to at least one of the following.

The WTRU may identify an assignment as the final assignment if the value of the ARI for this assignment is different from at least one other assignment of a set. The set may consist of all assignments of a subframe or all assignments. In this case, the value of the ARI (or of the TPC command for the PUCCH) for this assignment may not be directly used to indicate an index to a PUCCH resource. The determination of an assignment as the final assignment may be subject to at least one of the following additional conditions.

In an example, the number of other assignments, possibly only in the same subframe, may be at least one. In another example, the at least one other assignment may be assignments that are preceding the final assignment according to a pre-defined sequence (e.g., carrier first, subframe second). In a further example, the at least one other assignment may include at least one assignment that does not correspond to the primary cell. In still another example, the value of the ARI for the final assignment may be a fixed or configured value. In yet another example, the value of the ARI for the final assignment may be related to the value of the ARI in other assignments. For example, the value of the ARI of the final assignment may indicate a PUCCH resource with a number of RB's smaller than or equal to the PUCCH resource indicated by the value of the ARI in other assignments. Further, the value of the ARI of the final assignment may be the sum of the ARI decoded in other assignments, plus a fixed or configured value (or XOR'ed with a fixed or configured value). For instance, the value of the ARI of the final assignment may be one (1) plus the value of the ARI in other assignments (modulo the number of possible ARI values).

In case the WTRU does not detect the final assignment based on one of the above solutions, the WTRU may consider that the codebook is undetermined and apply actions according to solutions described in other paragraphs. Alternatively, the WTRU may append at least one NACK (or "0") to the codebook such that the total size of the codebook corresponds to a valid size among a set of pre-defined or configured valid sizes.

An indication may consist of a field received as part of downlink control information associated with each PDSCH transmission. The field may indicate to the WTRU the remaining number of assignments to be expected after the detection of a current assignment, within a group of downlink assignments (possibly for a subframe and/or a component carrier). The WTRU may better determine missing PDSCH and may also a NACK value for any missing PDSCH in the appropriate location of a feedback report. In another solution, the field may indicate the total number of downlink assignments in a group of downlink assignments and/or a subframe and/or a component carrier. The WTRU may determine the total number of missing PDSCH and may indicate this to the serving cell in a feedback report.

An indication may consist of a field received as part of downlink control information associated with each PDSCH transmission, for example a DAI. The DAI may serve as an ascending counter ordered along a parameter of the serving cells (e.g., the DAI may serve as a cumulative counter of total assignments up to a current assignment, counted in the direction of increasing serving cell index). For example, assuming a 2-bit DAI, and with serving cells ordered in increasing serving cell index, a first assignment on a first serving cell (e.g., a serving cell with lowest serving cell index) may have DAI=00, a second assignment on a second serving cell (e.g., a serving cell with second lowest serving cell index) may have DAI=01, and so on.

In another solution, the DAI may serve as a descending counter ordered along a parameter of the serving cells (e.g., the DAI may serve as a counter of the remaining assignments in the direction of increasing serving cell index). For example, assuming a 2-bit countdown DAI, and with serving cells ordered in increasing serving cell index, a last assignment (e.g., an assignment on a serving cell with highest serving cell index) may have countdown DAI=00, a second to last assignment (e.g., an assignment on a serving cell with highest serving cell index remaining) may have countdown DAI=01, and so on.

The counters may increment by unit values or may not have unit counting steps. For example, the decreasing counter of remaining assignments may repeat a DAI value for some consecutive assignments. For example the decreasing counter of remaining assignments may repeat the same value for P consecutive assignments. In an example, if we assume 10 serving cells with assignments, and P=3, the countdown DAI may be assigned as follows (in order of increasing serving cell index): 11 10 10 10 01 01 01 00 00 00. In such a solution, a WTRU may expect the final P=3 assignments to have a countdown DAI of 00. In such a solution, a WTRU may be able to resolve whether it has successfully received a last downlink assignment. However, if one of the assignments with a countdown DAI is missing, a WTRU may have to report NACK for all P=3 consecutive assignments sharing the same countdown DAI given that it may not know which of the P=3 consecutive assignments is missing.

A hybrid solution may be possible, where both an increasing cumulative counter of assignments, and a decreasing counter of remaining assignments are used. For example a unit step increasing counter may be used (e.g., a cumulative counter of assignments where the DAI is increased by one for every assignment) and a repeating counter of remaining assignments may be used (with P repetitions). For example, assuming 2-bit cumulative and countdown DAIs, ten assignments may have the following total DAI values (where the first two bits represent the cumulative DAI using unit step increments and the last two bits represent the countdown DAI using P=3): 0011 0110 1010 1110 0001 0101 1001 1100 0000 0100. In this case, from the cumulative counter the WTRU may determine what, if any, assignment is missing, except for any $2^{N+i}$ consecutive missing assignments (where N is the size in bits of the cumulative DAI and i is an integer greater than or equal to 0) and/or any last missing assignment. Also, from the repeating and decreasing counter of remaining assignments, the WTRU may determine if up to $P*2^M$ consecutive assignments are missing (where M is the size in bits of the countdown DAI), as well as if the last downlink assignment is missing. Combining the two DAIs, the WTRU may resolve any consecutive assignments except for those that are greater than the lowest common multiples of $P*2^M$ and $2^N$. The values of M and N need not be equal. For example, a situation where the cumulative counter uses N=2 bits, and the decreasing counter of remaining assignments uses M=1 bit and a repetition of P=3, may lead to a WTRU being able to resolve whether a last assignment is missing, and any other missing assignments except for 12 or more consecutive assignments.

The field may also indicate other information relevant to HARQ feedback for each value, such as an indication of the format and/or resource index of the PUCCH to transmit on ("ACK/NACK resource indicator"). For example, if the field size is three bits, the value "010" may indicate that PDSCH may be received in a first set of cell groups configured by higher layers and that transmission of HARQ feedback takes place over a certain PUCCH format and a first value of the resource index configured by higher layers; the value "011" may indicate that PDSCH may be received in first set of cell groups configured by higher layers and that transmission of HARQ feedback takes place over a second value of the resource index configured by higher layers, and so on. Alternatively, information about PUCCH resource index or indices to use may be provided in a separate field or in a separate PDCCH or E-PDCCH.

The same value of the indication may be received from more than one PDCCH or E-PDCCH (i.e., in any cell from which the WTRU receives a PDSCH assignment), to ensure robustness against missed detections. The indication may also be contained in a PDCCH or E-PDCCH of a specific DCI format in a specific cell or search space independently of other PDCCH or E-PDCCH containing PDSCH assignments for this WTRU. For example, the indication may be contained in a PDCCH received in a common search space. The indication may be valid for a duration of one subframe or more than one subframe (such as one frame).

In an example, a generalized indicator may be used. An indication may consist of a field which may be interpreted either as a downlink assignment index (DAI) or as a codebook indicator or codebook size indicator depending on its specific value, or depending on the value of an associated flag or field. For example, the indication may consist of a field of N bits, where the interpretation of N−1 bits depends on the value of a specific bit. Table 4 provides an example.

In a further example, the codebook size values may be pre-defined or configured by higher layers.

TABLE 4

| Value | Interpretation |
|---|---|
| 000 | DAI with value 00 |
| 001 | DAI with value 01 |
| 010 | DAI with value 10 |
| 011 | DAI with value 11 |
| 100 | Codebook size #1 |
| 101 | Codebook size #2 |
| 110 | Codebook size #3 |
| 111 | Codebook size #4 |

In another example, the codebook determination may use DAI and size indicators. In some examples, the WTRU may determine a codebook based on zero or more DAI(s), and zero or more codebook indicator(s) or codebook size indicator(s) received from downlink assignment(s). In such solutions, the WTRU may determine a codebook (or portion thereof) based on the received DAI(s) and verify that this codebook (or portion thereof) is consistent with any applicable received codebook indicator. In case the WTRU determines that the DAI-codebook is consistent with the received codebook indicator, the WTRU may transmit HARQ-ACK according to the DAI-codebook. Otherwise, the WTRU may transmit other information and/or perform other actions as will be described herein.

A received codebook indicator may be applicable to the entire HARQ-ACK codebook or to a subset of the HARQ-ACK codebook. In the latter case, the subset may correspond to the downlink assignment(s) received in the same subframe as the one where the codebook indicator is received. Alternatively, the subset may correspond to the downlink assignments(s) received in the subframe(s) preceding and including the subframe where the codebook indicator is received. Similarly, a DAI-codebook may be applicable over the entire HARQ-ACK codebook or to a subset.

A codebook indicator may indicate a range of possible codebook sizes, a set of possible codebook sizes or a specific size. For example, a specific codepoint of the indicator may correspond to a range of sizes between 21 bits and 50 bits. In this case, the WTRU may determine that the DAI-codebook is consistent with an applicable received codebook indicator if its size is within the indicated range, or if it is equal to the indicated size. A codebook indicator may correspond to a PUCCH format indicator, where the indication of a PUCCH format implicitly indicates a range of possible sizes for the codebook. For example, an indication of PUCCH format 3 may implicitly indicate that the codebook size is below or equal to 21 bits.

In some examples, the WTRU may implicitly derive a range or set of codebook sizes from other properties or fields of downlink control signaling instead of an explicit codebook indicator. For example, the WTRU may derive a range of possible codebook sizes from an indication of the number of RBs allocated to PUCCH, or from a resource indication (for example, an ARI) for a PUCCH, possibly in combination with a PUCCH format indicator. The set of possible codebook sizes for a certain number of RB's of a PUCCH or for a certain value of ARI may be pre-defined or configured by higher layers. For example, the set of possible codebook sizes may be configured as {16, 32, 48, 64, 80, 96, 112, 128} for ARI=2 and as {24, 40, 56, 72, 88, 104, 120} for ARI=3.

A specific downlink assignment may contain a codebook indicator, a DAI or both a codebook indicator and a DAI. When a downlink assignment does not indicate a DAI (for instance, when a generalized indicator has a value not corresponding to a DAI), the expected DAI value in the next received downlink assignment may be incremented as if a DAI was received.

When the WTRU determines that the DAI-codebook is not consistent with the codebook indicator for at least one portion of the codebook, the WTRU may adjust the size of the codebook for the at least one portion to a value corresponding with the codebook indicator, if such indicator indicates a specific size. The WTRU may indicate NACK for all bits of the at least one portion. In case the WTRU determines that the DAI-codebook is not consistent with the codebook indicator for at least one portion of the codebook but cannot determine the correct size of the codebook (e.g., if the indicator only indicates a range of sizes), the WTRU may consider that the codebook is undetermined and may perform actions described herein.

In the above, an indication may consist of the value of a field included in the payload of the DCI, or of the value of a field used to mask a subset or all bits of the CRC.

In some examples, the codebook may be indicated by the network to the WTRU in a dynamic manner. For example, a codebook indicator may be included in at least one of all the downlink assignments whose transmissions map to a single HARQ A/N feedback resource. The meaning of the codepoints in the codebook indicator may be configured by the network, possibly semi-statically. For example, an RRC command may be used to indicate to the WTRU the possible codebooks for each codepoint (where the WTRU may select the appropriate codebook based on the indicator and at least one serving cell). In order to improve the granularity of the codebook, and thus possibly augment the gains of using a dynamic codebook, the number of indicator bits may be increased. For example, 4 indicator bits may be used, and each one of the 16 possible codepoints may map to a plurality of codebooks depending on the serving cell of at least one assignment. Such configuration may require large RRC payload and may not be tenable.

The meaning of a codebook indicator for a codebook may be determined by a combination of the configuration of a subset of codepoints and of at least one serving cell. For example, a WTRU may be configured, possibly by the RRC with a number of sets of carriers (e.g., 4 sets of up to 8 carriers each, or 8 sets of up to 4 carriers each, or 16 sets of up to 2 carriers each, or 32 sets of 1 carrier each). The sets may be pre-determined, or may be explicitly configured by the network. Or the sets may be determined at the WTRU by a network-transmitted indicator of total number of sets, and the WTRU splitting up the configured carriers in a pre-determined or pre-configured manner (e.g., the WTRU may order the carriers by an index such as cell index and then may evenly split the carriers into the configured number of sets). The WTRU may also be configured (possibly semi-statically) with a table mapping the first x (e.g., x=2) bits of the indicator to sets of carriers. The other remaining y bits of the indicator (e.g., y=2) may be determined as a function of the table used for the first x bits, and possibly as a function of at least one serving cell.

As an example, the network may indicate to the WTRU that it is to use 4 sets of carriers. Each set of carriers may include up to 8 carriers (e.g., set A={1, 2, 3, 4, 5, 6, 7, 8}, set B={9, 10, 11, 12, 13, 14, 15, 16}, set C={17, 18, 19, 20, 21, 22, 23, 24} and set D={25, 26, 2, 28, 29, 30, 31, 32}). The WTRU may also be configured (possibly semi-statically) with a table mapping the first 2 bits of the indicator to different sets, for example, as shown in Table 5.

TABLE 5

| Index Value (First 2 bits) | Set of Cells for Which to Report HARQ A/N Feedback |
|---|---|
| 00 | Select the set that includes at least one cell where PDSCH is scheduled among: A or B or C or D |
| 01 | Select the set that includes at least one cell where PDSCH is scheduled among: AB or CD |
| 10 | Select the set that includes at least one cell where PDSCH is scheduled among: AC or BD |
| 11 | Select the set that includes at least one cell where PDSCH is scheduled among: AD or BC |

The meaning of the last two bits of the indicator may be determined by using the empty set for at least one codepoint (e.g., '00') and then for all other codepoints using the complement of the sets determined from the at least one serving cell (where the complement of A is denoted by $A^c$ and is given by BCD in this example). Table 6 shows an example of the meaning of the last 2 bits of the codebook indicator.

TABLE 6

| Index Value (Last 2 bits) | Set of Cells for Which to Report HARQ A/N Feedback |
| --- | --- |
| 00 | Empty set |
| 01 | Complement of set obtained by codepoint '01' in first two bits of index |
| 10 | Complement of set obtained by codepoint '10' in first two bits of index |
| 11 | Complement of set obtained by codepoint '11' in first two bits of index |

For example, a WTRU configured with Table 5 for the first two bits of the indicator and receiving an assignment from a cell in set A may interpret the first two bits of the indicator from Table 7 and may then interpret the last two bits of the indicator from Table 8. The over-all codebook may be determined from the union of sets obtained from the first two and last two bits of the codebook indicator. In this example, if the WTRU decodes an assignment from a cell in set A and is also given the codebook indicator codepoint 0110, then from the fact that it has at least one cell in set A, the meaning of the first two bits (01) may mean set AB and the meaning of the last two bits (10) may mean set BD. Therefore in this case, the codebook may include the union of the two sets and thus all cells in sets A, B and D.

In another example, the WTRU may decode an assignment in a cell in set A with codebook indicator (0000), then from Table 7 and Table 8, it may be determined that the codebook is the union of set A and the empty set, and therefore includes all cells in set A.

TABLE 7

| Index Value (First 2 bits) | Set of Cells for Which to Report HARQ A/N Feedback |
| --- | --- |
| 00 | A |
| 01 | AB |
| 10 | AC |
| 11 | AD |

TABLE 8

| Index Value (Last 2 bits) | Set of Cells for Which to Report HARQ A/N Feedback |
| --- | --- |
| 00 | Empty set |
| 01 | (AB)c = CD |
| 10 | (AC)c = BD |
| 11 | (AD)c = BC |

In another example, the sets for every codepoint in Table 5 may be determined by a WTRU as a function of the total number of sets and of a pre-configured or pre-determined formula. For example, codepoint '00' may be any single set, whereas codepoint '01' may be pairs of two sets (e.g., elect the set that includes at least one cell transmitting the index from: AB or CD or EF or GH or . . . ), codepoint '10' may be groups of three sets (e.g., select the set that includes at least one cell transmitting the index from: ABC or DEF or GHI or . . . ), codepoint '1' may be groups of four sets (e.g., select the set that includes at least one cell transmitting the index from: ABCD or EFGH or . . . ).

In a further example, the WTRU may make a determination of order of the information bits in the codebook. The WTRU may make a selection of a codebook permutation to optimize decoding performance. In some solutions, the WTRU may determine or select an order (or sequence) for the transmission of HARQ-ACK bits in a subframe. The selection of an appropriate order may enhance decoding performance of HARQ-ACK at the network side by avoiding those HARQ-ACK bits that are known by the network to be NACK (e.g., because they correspond to cells/subframe where PDSCH was not transmitted) that are in consecutive positions of the codebook.

The order may be selected based on an indication from downlink control signaling (such as a codebook indication or a shuffling indication). Alternatively, the order may be determined based on the set of PDSCH received or not received in cells and/or subframes for which HARQ-ACK is to be reported. Further, the order may be dependent on the total size of the HARQ-ACK codebook in a particular subframe.

In some examples, the WTRU selects one of a number of possible codebooks which may comprise the same number of bits but where the position of each bit corresponds to the ACK or NACK outcome of PDSCH for different cells, subframes and/or transport blocks of a cell. For example, in a first codebook the 23rd bit may correspond to the 1st transport block received from the 12th configured cell, while in a second codebook the 23rd bit may correspond to the 2nd transport block received from the 18th configured cell. The total number of bits of each codebook may be determined based on the number of configured cells, the number of transport blocks that can be received in each cell (depending on the transmission mode) and the subframe configuration.

In some examples, a set of codebooks may be constructed from interleaving or re-ordering bits from a base codebook whose bit order is determined based on pre-defined rules. For example, the base codebook order may be first by order of transport block(s) within a cell, then by order of subframe index (for TDD) second and lastly by order of configured cells. Another possible rule for a base codebook may be first by order of cells, then by order of subframe index (for TDD) and lastly by order of transport blocks.

A specific codebook of the set may correspond to a defined permutation of the bits from the base codebook. A set of permutations may be defined explicitly (e.g., using a Table) for each possible number of codebook sizes. For example, for a codebook size of 64 bits, 2 permutations may be defined as [1; 2; 3; 4; 5; . . . 64] and [1; 33; 2; 34; 3; 35; . . . 32; 64]. Alternatively, a set of permutations may be defined using a formula that may be dependent on the codebook size. The formula may implement a set of pseudo-random permutations, or a set of permutations where each permutation is characterized by a specific difference between consecutive entries, for example.

The codebook to use in a given subframe may be indicated by downlink control signaling. For example, the codebook may be indicated in a field of a DCI or the set of DCI's containing downlink assignments for the PDSCH for which HARQ-ACK is being reported. In another example, the codebook may be indicated in a field of a DCI used for providing dynamic scheduling information on the transmission of uplink control information on the PUCCH or PUSCH. In case only two codebooks are defined, the field may consist of a single bit, indicating whether the base codebook or the permuted (or "shuffled") codebook is to be used.

Alternatively, the codebook to use in a given subframe may be determined such that a certain metric dependent on the set of received PDSCH is optimized. For example, the codebook may be selected such that the maximum number of consecutive bits corresponding to A/N bits of the PDSCH that were not assigned (or not detected to be assigned) is minimized.

In some examples, the WTRU may not determine at least one property of the codebook based on the received downlink assignments, such that there would be certainty that it matches with the codebook assumed at the network side. In such a situation the codebook may be considered "undetermined" by the WTRU.

The WTRU may consider that the codebook is undetermined when one of the following occurs: the WTRU did not receive at least one codebook indicator (or codebook size indicator) from the set of downlink assignments; a field in the last received downlink assignment of a pre-defined sequence of cells/carriers and subframes, indicates that further downlink assignments should be received; the WTRU did not receive at least one codebook indicator from the set of downlink assignments for a subframe, where the codebook indicator indicates a set of cells, cell groups and/or transport blocks for this subframe only (possibly, only if a field received in the last subframe where a downlink assignment was received indicates that further downlink assignments may be present in the next subframe(s)); the WTRU did not receive at least one codebook indicator from the set of downlink assignments for the last subframe, where the codebook indicator indicates a set of cells, cell groups and/or transport blocks for all subframes up to and including the subframe where it is received (possibly, only if a field received in a downlink assignment in the same subframe as the last received codebook indicator indicates that further downlink assignments may be present in the next subframe(s)); and/or the DAI-codebook is not consistent with the codebook indicator for at least one portion of the codebook but cannot determine the correct size of the codebook (e.g., if the indicator only indicates a range of sizes).

When the WTRU considers that the codebook is undetermined, the WTRU may transmit HARQ-ACK using a default codebook defined from higher-layer configuration only; transmit an indication that the codebook is undetermined over a specific PUCCH resource and format or possibly over PUSCH if a PUSCH transmission is present (the specific PUCCH resource and/or format may be configured by higher layers, or may be obtained from downlink control signaling (e.g., ARI); the indication may consist of a single bit (e.g., corresponding to NACK) and may be multiplexed with HARQ-ACK of the default codebook, if transmitted); and/or refrain from transmitting any HARQ-ACK in either PUCCH or PUSCH.

In an example, a transmission of HARQ feedback using multiple feedback groups may be used. In some solutions, the HARQ feedback information that needs to be transmitted in a given uplink subframe may be represented by more than one set of information bits. Each such set may be referred to as a "feedback group" herein.

A feedback group may be defined based on cells, cell groups and/or subframes. For example, a first feedback group may include HARQ feedback from a first group of cells (e.g., a first group of 8 configured cells), a second feedback group may include HARQ feedback from a second group of cells (e.g., a second group of 8 configured cells), and so on.

In another example, a feedback group may be defined based on at least one of: the total number of information bits that needs to be transmitted in the subframe based on at least semi-static information, and an order of such information bits; a maximum or target number of information bits per feedback group; a maximum or target number of feedback groups; targeting an equal number of bits (or at most a difference of one bit) for each group; and minimizing the number of feedback groups. For example, in case the total number of information bits to be transmitted in a subframe would be 36 and the maximum number of information bits per feedback group would be 10, the feedback groups may consist of 4 groups of 9 bits.

In some solutions, the WTRU may encode and transmit information from a feedback group only if at least one PDSCH (or transport block) pertaining to this feedback group was received. In case at least one PDSCH was received for this feedback group, the WTRU may report "NACK" for cells and/or subframes from which PDSCH was not received and that pertain to this feedback group. Alternatively, the WTRU may report "DTX". For example, if a feedback group consists of HARQ feedback for a group of 3 cells with two transport blocks per cell, and PDSCH was received on the second cell only, there may be 6 information bits in the feedback group. The two first and two last information bits (corresponding to the cell from which PDSCH was not received) may indicate "NACK" while the two middle information bits (corresponding to the cell from which PDSCH was received) may indicate "ACK" if the transport block was decoded successfully and "NACK" otherwise.

In some solutions, the combinations of subsets of feedback groups may be limited to a set of valid combinations of feedback groups. For example, it may not be possible to transmit exactly one feedback group, such as group #2 only, but some combinations of 2 feedback groups may be possible (such as #1 and #2). The WTRU may transmit information from a feedback group to obtain a valid combination of groups even if no PDSCH pertaining to this feedback group was received. The set of valid combinations may be pre-defined or provided by higher layers.

In an example, separate processing of transmitted feedback groups may be used. In a solution, the information bits of each feedback group for which transmission takes place may be separately encoded. For example, if a first feedback group consists of 8 bits and a second feedback group consists of 10 bits, each feedback group may be encoded into 24 coded bits (using, for instance, a Reed-Muller block code). Subsequent modulation, spreading and mapping to physical resources may also be performed separately for each feedback group.

The number of coded bits to use for each feedback group may be a function of the number of bits of each feedback group. Each number of coded bits may be selected among a set of pre-determined values for the number of coded bits (such as 24 or 48). In some solutions, the selected number of coded bits may be selected to be the smallest number among the pre-determined values that achieves up to a maximum coding rate (e.g., ratio of the number of information bits to number of coded bits).

In an example, joint processing of transmitted feedback groups may be used. In a solution, the information bits of each feedback group for which transmission takes place may be jointly processed and mapped to a single resource. For example, there may be 4 defined feedback groups (labeled #1, #2, #3 and #4) consisting of 8, 12, 10 and 14 bits respectively. In a subframe where feedback groups #1, #3 and #4 are transmitted, a total of B=32 bits (=8+10+14) may be encoded.

The encoding may consist of multiple Reed-Muller block codes where the set of B bits may be equally split into M subsets of up to N information bits and where each subset is independently encoded. The coded bits from the M subsets may then be multiplexed prior to subsequent processing (which possibly includes modulation, spreading and mapping to physical resources). Such type of encoding may improve performance at the receiver by reducing the total number of codeword candidates to be tested. The number M of subsets may be a function of the number B of bits according to a pre-defined function. For example, M may be set to the smallest integer larger than the ratio B/N.

In another example, the encoding may use other types of codes such as convolutional or turbo encoding. The type of encoding used in a specific subframe may be a function of the number B of bits to be transmitted given the subset of feedback groups for which transmission takes place. For example, in a subframe where the subset of feedback groups results in B⇐B0 bits to be transmitted (where B0 could be a fixed value such as 40), the WTRU may use multiple Reed-Muller block codes. In a subframe where B is larger than B0 but smaller or equal than B1 (where B1 could be a fixed value such as 100), the WTRU may use convolutional encoding. In a subframe where B is larger than B1 the WTRU may use turbo encoding.

A set of CRC bits may be appended to the set of B bits prior to encoding to improve reliability. The number of CRC bits may depend on the number of bits B, or may depend on the type of encoding applied. For example, zero (0) CRC bits may be appended when B is smaller or equal than B0 bits, or when convolutional or turbo encoding is not used.

Figure 5:
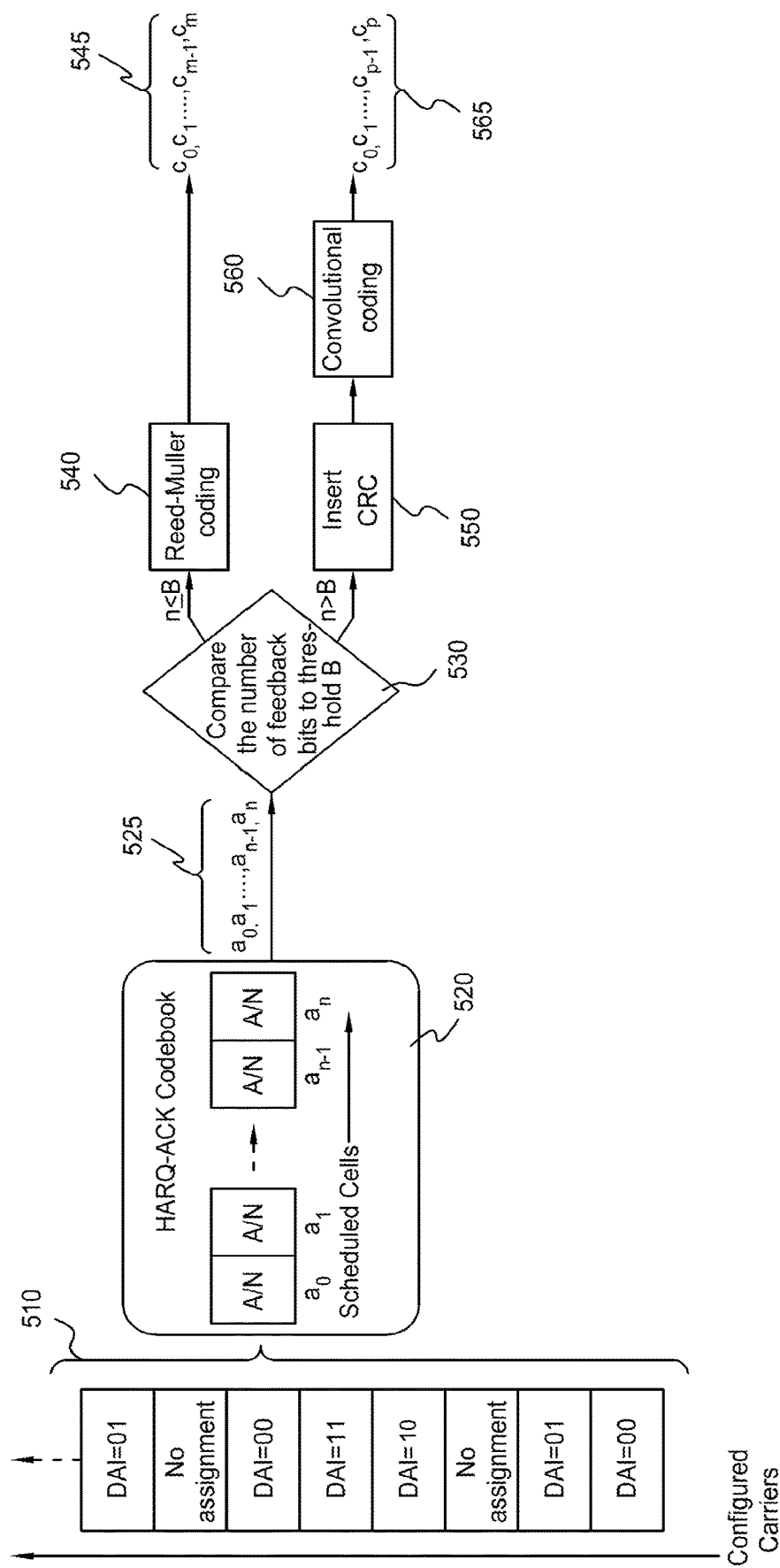
FIG. 5 is a diagram of an example selection process for channel coding and inclusion of cyclic redundancy check (CRC) based on the number of feedback bits to be transmitted.

FIG. 5 is a diagram of an example selection process for channel coding and inclusion of CRC based on the number of feedback bits to be transmitted. As shown in process 500, the WTRU may receive a plurality of transport blocks over a set of a plurality of configured carriers 510 and generate HARQ-ACK feedback 520 for the plurality of transport blocks. The inclusion of HARQ-ACK feedback for a carrier may be based on a DAI field present in a downlink assignment for that carrier. Further, supplemental HARQ-ACK feedback bits may be inserted in the HARQ-ACK Codebook, depending on the value of successive DAIs detected by the WTRU. Further, there may be no downlink assignment for a carrier. The HARQ-ACK feedback 520 may use HARQ-ACK feedback bits 525. The WTRU may determine the number of HARQ-ACK feedback bits used. The WTRU may compare the number of HARQ-ACK feedback bits, which may be represented by n, to a threshold, such as threshold B 530. In an example, if the number of feedback bits is less than or equal to the threshold and therefore n≤B, then Reed-Muller coding may be used 540. The set of encoded feedback bits 545 may result from the Reed-Muller coding. Further, if the number of feedback bits is greater than the threshold and therefore n>B, then the WTRU may insert or append CRC 550. Also, if the number of feedback bits is greater than the threshold and therefore n>B, then the WTRU may use convolutional coding 560. The set of encoded feedback bits 565 may result from the convolutional coding.

In some solutions, a finite set of possible number of information bits B' (or payload sizes) prior to encoding may be allowed to simplify decoding at the receiver. This set may be pre-defined or be determined from the configuration (such as the number of cells, groups of cells, number of transport blocks per cell, and so on). The specific payload size B' to use in a specific subframe may also be determined dynamically from downlink control signaling. For example, a field in a PDCCH/E-PDCCH may indicate one of a set of possible payload sizes B' that are pre-defined or configured by higher layers. In another example, a field may indicate one of a set of possible PUCCH formats, each of which corresponding to a payload size depending on the configuration (number of cells, cell groups, and so on). The WTRU may use padding bits when the number B of bits to transmit is lower than an allowed number of information bits B'. For example, a set of possible payload sizes may be 20 bits, 50 bits and 100 bits. In case the number of bits to be transmitted B, based on a selected subset of feedback groups, would be 60 bits, the WTRU may employ padding bits such that the total payload is 100 bits. The WTRU may also transmit information from additional feedback groups (not initially selected) such that the total number of bits matches a valid payload size.

The number of coded bits to use may be a function of the total number of bits B or the payload size B'. It may be selected among a set of pre-determined values for the number of coded bits. In some solutions, the selected number of coded bits may be selected to be the smallest number among the pre-determined values that achieves up to a maximum coding rate (i.e., the ratio of the number of information bits to number of coded bits).

In an example, a determination of a resource may be used. As described herein, a resource may refer to a set of transmission properties for the transmission of feedback (e.g., over PUCCH). The resource may be identified by an index from which all properties are derived, such as a set of RBs, properties of one or more DM-RS sequence(s), at least one spreading sequence, and the like. In case PUCCH is configured on multiple cells, a resource may include the cell on which PUCCH is to be transmitted, or a set of cells. A sub-resource may refer to a portion of such resource—for example, one RB in case the resource consists of a set of more than one RB, or one spreading sequence in case the resource consists of a set of more than one spreading sequence, or one cell in case the resource consists of multiple cells.

The WTRU may determine the resource or sub-resource used for the transmission of a feedback group, or a combination of feedback groups, based on downlink control signaling that may be associated with at least one of the PDSCH pertaining to the feedback group. For example, the resource or sub-resource may be indicated by an ARI field in a PDCCH/E-PDCCH scheduling a PDSCH pertaining to the feedback group or to a feedback group part of the combination. In another example, the resource or sub-resource may depend on the cell or cell group from which the PDCCH/E-PDCCH is decoded, or the cell or cell group of a corresponding PDSCH. For example, the cell on which PUCCH is transmitted may be the cell in the same cell group as the cell group from which PDCCH/E-PDCCH is decoded. In another example, signaling such as described herein may be used.

The resource used for the transmission of a combination of feedback groups may depend on the number of coded bits and/or associated PUCCH format, possibly in combination with an ARI. For example, the WTRU may select a first resource if the number of coded bits is a first number and the received ARI is a first value, and a second resource if the number of coded bits is a second number and the received ARI is a first value. The mapping between the resource and a combination of ARI and number of coded bits may be configured by higher layers. In another example, the WTRU may be configured with a single resource for each PUCCH format or for each possible number of information bits or coded bits. In this case, the WTRU may select the PUCCH resource corresponding to the number of information bits or coded bits that needs to be transmitted (or the PUCCH format that needs to be used).

In an example, fixed mapping of a feedback group to a sub-resource with possible zero-power transmission may be used. The WTRU may determine the resource or sub-resource used for the transmission of a feedback group (or a combination of feedback groups) based on a combination of downlink control signaling that may be associated with any PDSCH and of an index or order associated with this feedback group. For example, the combination of an index received from an ARI field and of an index to the feedback group may determine the resource or sub-resource for the transmission of this feedback group. For example, a specific value of ARI may indicate a resource spanning two (2) contiguous RBs, and there may be two feedback groups to be transmitted. In this case the sub-resource used for the first feedback group may be the first of the two RBs, and the sub-resource used for the second feedback group may be the second of the two RBs.

In case no transmission needs to take place for a feedback group, the WTRU may transmit with zero power (i.e., may not transmit) on the corresponding sub-resource. In some solutions, the WTRU may transmit on a sub-resource even if no transmission needs to take place for the corresponding feedback group to ensure that the signal transmitted by the WTRU spans contiguous RBs. The WTRU may perform such transmission, for instance, if the sub-resource is over a RB and non-zero-power transmission takes place on both adjacent RBs. In this case, the WTRU may encode the information for the corresponding feedback group according to a pre-determined rule, for instance as if the WTRU reports "NACK" or "DTX" for all corresponding transmissions of the feedback group.

In an example, flexible mapping of a feedback group to a resource with a possible indication may be used. The resource used for the transmission of a specific feedback group may also be determined based on the subset (or combination) of feedback groups that are transmitted in the subframe. This solution may ensure that the combination of resources used for the transmission of all feedback groups results in a signal with desirable properties, such as a signal which spans contiguous resource blocks. For example, there may be 4 defined feedback groups (labeled #1, #2, #3 and #4) and the value received from downlink control signaling (e.g., ARI) may determine a set of resources spanning 4 contiguous resource blocks (labeled #a, #b, #c and #d). When all 4 feedback groups are transmitted, groups #1, #2, #3 and #4 may be mapped to resources #a, #b, #c and #d respectively. On the other hand, if only groups #1, #2 and #4 are transmitted, these groups may be mapped to resources #a, #b and #c such that only contiguous resource blocks are used. When there is possible ambiguity for the network on the identity of the feedback group transmitted on a given resource, the WTRU may include an indication of the feedback group in at least this resource, such as a bit indicating whether the feedback group transmitted over resource #c is #3 or #4. Such indication may be jointly or separately encoded with the information bits from the feedback group.

In an example, a transmission of a feedback group indicator may be performed. In some solutions, the WTRU may transmit at least one indication of the subset of feedback groups transmitted in a subframe to facilitate decoding at the receiver. Such indication may be referred to as "feedback group indication" (FGI) in the following. A value of FGI may indicate one of a set of valid possible combinations of feedback groups, including a codebook size. The mapping between each possible FGI value and a combination of feedback groups may be provided by higher layers or pre-defined. The mapping may be dependent on the total number of information bits B, and/or the payload size B' for the transmission in the subframe. In some solutions the FGI may consist of an indication of a transmission format for PUCCH.

In a solution, a FGI may be processed separately from other feedback bits and mapped to specific physical resources. For example, FGI bits may be encoded, modulated, spread and mapped to specific sub-carriers and/or slots of a resource block. This solution has the benefit that multiple possible numbers of information bits (B) may be supported without excessively increasing complexity at the receiver, since the receiver can first determine the number of information bits by first decoding the FGI.

In a solution, FGI bits may be concatenated to other feedback bits (and possibly interleaved) prior to subsequent joint processing (possibly including at least one of coding, modulation, spreading and mapping to physical resources). This solution may be particularly beneficial if the possible set of payload size(s) is known at the receiver.

In a solution, FGI bits may be used to mask a CRC appended to the set of feedback bits. This solution has the benefit of providing increased reliability through error detection while at the same time reducing the possibility of error in the feedback transmission due to missed PDSCH assignments or falsely detected PDSCH assignments. At the receiver, the network may attempt decoding assuming a given payload size (or a set of possible payload sizes) and checking if the CRC masked by the expected FGI value given the transmitted PDSCH is valid.

In a solution, the resource used for the transmission of feedback may be a function of the FGI, possibly in combination with information received from downlink control signaling (such as ARI) and higher layers. This solution provides an implicit FGI signaling mechanism since the receiver can determine the FGI from the resource from which the feedback information could be decoded.

In an example, power setting may be used. The WTRU may determine the power to apply for a transmission containing feedback information (including a transmission only containing feedback information, such as a PUCCH transmission) based on at least a path loss estimate $PL_c$, a configured maximum power $P_{CMAX,c}$, parameters provided by higher layers such as $P_{0\_PUCCH}$, $Delta_{F\_PUCCH}$ and $Delta_{TxD}$, a parameter dependent on received TPC commands $g(i)$ and/or a power offset h that is a function of parameters that may change on a subframe basis as described in the following.

In some solutions, a power offset may be a function of at least one of: a total number of information bits B based on the subset of feedback groups selected for transmission, possibly including feedback groups transmitted to ensure transmission over contiguous RBs; the largest number of information bits of a feedback group among a subset selected for transmission; a number of transport blocks based on received PDSCH; a number of transport blocks based on received PDSCH in each feedback group, or the maximum thereof among feedback groups; a maximum number of transport blocks that may be received based on configuration; a payload size B' for the transmission of feedback information in the subframe; the type of coding employed in the subframe (Reed-Muller, convolutional, turbo); whether CRC and/or FGI is appended to the set of transmitted feedback bits; a number of subsets M of bits independently encoded prior to multiplexing; and a number of bits transmitted in each subset of independently encoded bits, or the maximum thereof among all subsets, where the number of bits may or may not be restricted to those corresponding to received PDSCH.

The power offset function may depend on different parameters depending on the type of coding that is being utilized, or more generally depending on the transmission format being used. For example, in case coding is based on a block code such as Reed-Muller, the power offset may be a function of the number of transport blocks based on received PDSCH in the subframe, or perhaps the maximum number thereof among independently encoded subsets. On the other hand, in case coding is based on a convolutional code or a turbo code, the power offset may be a function of the maximum number of transport blocks that may be received based on configuration. This solution may be appropriate since, in case block coding based on small codebooks is used, the receiver can utilize the knowledge of information bits that are known to be set to NACK (based on scheduled PDSCH) to improve the likelihood of correct detection.

In legacy systems, the number of coded modulation symbols per layer Q' for HARQ-ACK may be set to a value proportional to the number of information bits for HARQ-ACK, the number of sub-carriers of the initial PUSCH transmission and a factor $\beta_{offset}^{HARQ-ACK}$, but not larger than 4 times the number of sub-carriers of the PUSCH. Coding, interleaving, multiplexing and mapping of higher layer data is performed independently of the presence or absence of HARQ-ACK. When HARQ-ACK is transmitted, its coded modulation symbols may overwrite the symbols used for higher layer data in certain resource elements, resulting in modest performance degradation for higher layer data due to puncturing.

When a large number of HARQ-ACK bits need to be transmitted, it may be possible that the limit of 4 times the number of sub-carriers of the PUSCH becomes insufficient, for example in power-limited scenarios where it may not be possible to have very large bandwidth for PUSCH. In some solutions, the limit of 4 times the number of sub-carriers of the PUSCH allocation may be lifted such that modulation symbols for HARQ-ACK may be mapped to additional resources (for example, time symbols) on PUSCH.

In some solutions, to prevent performance degradation due to excessive puncturing, the WTRU may process higher layer data taking into account that at least some resource elements are not available for higher data due to the transmission of HARQ-ACK, or of a minimum number of bits thereof. More specifically, the following parameters or procedures may be affected. The transport block size of the higher layer data may be affected. For example, the calculation of the transport block size as a function of the signaled modulation and coding scheme (MCS) and of the size of the PUSCH allocation (in resource blocks) may take into account a number of time symbols that are not available due to the transmission of HARQ-ACK. For example, in case the number of modulation symbols required for HARQ-ACK exceeds 4 times the number of subcarriers of the PUSCH, the transport block size may be scaled down by a factor $(12-4)/12=\frac{2}{3}$ to take into account the fact that at least ⅓ of the time symbols (not used for DM-RS) are not available for higher-layer data when HARQ-ACK may need to be transmitted. The procedure of mapping to REs for PUSCH may be changed such that a subset or all of the REs on which symbols for HARQ-ACK are mapped are excluded from the set of REs on which symbols for PUSCH may be mapped. For example, the REs on the 4 first time symbols on which symbols for HARQ-ACK may be mapped may be excluded.

The WTRU may determine that higher layer data is processed according to the above based on at least one of the following conditions. The WTRU may determine higher layer data is processed according to explicit signaling from a received PDCCH/E-PDCCH. The received PDCCH/E-PDCCH may be the PDCCH/E-PDCCH containing the uplink grant for the concerned PUSCH transmission, or another received PDCCH/E-PDCCH possibly indicating information about a set of PDSCH and/or PUSCH transmissions. A new or existing field of a DCI may be used for this purpose. This solution has the benefit of robustness against the loss of downlink assignments. The WTRU may determine higher layer data is processed according the number of HARQ-ACK information bits to be transmitted in the PUSCH. The WTRU may also determine higher layer data is processed according to whether the number of symbols for HARQ-ACK exceeds a threshold, such as 4 times the number of sub-carriers of the PUSCH transmission.

In an example, a WTRU may select an uplink resource for UCI transmission. In examples, the WTRU may determine a resource for transmission UCI in the following situations: possibly multiple types of physical channels available for transmission of UCI, e.g., both PUSCH and PUCCH; possibly multiple types of UCI available for transmission, e.g., HARQ-ACK, CSI or SR; and/or possibly some cells on carriers operating in an unlicensed frequency band (for example, LAA).

In an example, a WTRU may split UCI across PUSCH and PUCCH. In one example method, the WTRU may determine that a first amount of UCI may be applicable to a first type of transmission, e.g., PUCCH while a second amount may be applicable to a second type of transmission (e.g., PUSCH). Possibly, such method may be applicable per group of cells e.g., for a PUCCH group or for a cell group (e.g., a CG).

For example, the first amount of UCI may correspond to a specific type of UCI e.g., HARQ A/N bits. For example, the second amount of UCI may correspond to other type of UCI e.g., CSI such as CQI, precoding matrix indicators (PMI) or RI bits.

In a subframe in which the WTRU is expected to transmit UCI, the WTRU may determine whether or not at least one PUSCH resource is available for the concerned subframe. The WTRU may also determine whether or not it is configured for simultaneous transmissions on PUCCH and PUSCH for a given serving cell or group of cells.

If the WTRU may perform transmission simultaneously on PUSCH and PUCCH (e.g., resources are available and the WTRU is configured for such operation), the WTRU may determine that a first type of the UCI e.g., HARQ-ACK may be transmitted on a PUSCH transmission while the second type of UCI e.g., the CSI may be transmitted on a PUCCH transmission, or vice-versa. The WTRU may also determine that a first portion of a given type of UCI (e.g., HARQ-ACK) may be transmitted on a PUSCH transmission while a second portion may be transmitted on a PUCCH transmission. according to at least one of the following: reception of downlink control signaling e.g., using similar methods as described herein (such signaling may indicate that UCI shall be split using the PUSCH and PUCCH transmissions); reception of downlink control signaling, e.g., using similar methods as described herein (such signaling may include a UCI request where the indicated UCI may be routed to a first specific resource and/or transmission (e.g., PUCCH, or possibly the resource indicated by dynamic scheduling, e.g., according to that described herein) while other feedback may be routed to a second specific resource and/or transmission (e.g., PUSCH, or possibly dropped), or vice-versa); the PUSCH allocation (e.g., the size of the grant) is smaller (or equal to) a (possibly configurable) threshold; the resulting ratio of the number of (non-UCI) payload bits and the number of UCI bits for the concerned PUSCH transmission is equal or higher than a specific threshold for the concerned amount of UCI bits; the resulting ratio of the number (non-UCI) payload bits and the number of HARQ A/N bits for the concerned PUSCH transmission is equal or higher than a specific threshold; the number of modulation symbols Q' per layer for a UCI type and the concerned PUSCH transmission would exceed a threshold (for example, the threshold may be 4 times the number of sub-carriers of the PUSCH in case of HARQ-ACK).

When at least one of the above conditions is met, the WTRU may determine the portion of UCI bits transmitted on each channel according to at least one of the following. The WTRU may determine the portion according to information including a first type of UCI (e.g., the HARQ ACK bits) in the concerned PUSCH transmission up to the required number of symbols for the concerned UCI. The WTRU may transmit remaining UCI (e.g., of the second type e.g., the CSI bits) using a transmission on PUSCH. Also, the WTRU may determine the portion according to information including a number of UCI bits in the PUSCH transmission based on the PUSCH allocation (e.g., the size of the grant); the remaining UCI bits may then be transmitted using a different transmission. For example, the WTRU may determine a number of HARQ-ACK bits which would results in a number of modulation symbols Q' per layer no larger than a threshold that may be dependent on the size of the PUSCH, such as N times the number of sub-carriers. In another example, the number of UCI bits in the PUSCH transmission (possibly of a given type) may be set to zero and all bits may be transmitted over a different transmission.

In an example, a WTRU may split UCI across multiple PUCCHs. In one example method, the WTRU may determine that a first amount of UCI may be applicable to a first type of transmission, e.g., PUCCH on the resources of a first serving cell (e.g., the PCell) while a second amount may be applicable to a first type of transmission (e.g., PUCCH) on the resources of a second serving cell (e.g., SCell configured with PUCCH). Possibly, such method may be applicable per group of cells e.g., for a PUCCH group or for a cell group (e.g., a CG), or across PUCCH groups or CGs.

For example, the first amount of UCI may correspond to a specific type of UCI e.g., HARQ A/N bits. For example, the second amount of UCI may correspond to other type of UCI e.g., CSI such as CQI, PMI or RI bits. In such case, the WTRU may determine the cell with PUCCH on which to transmit a first UCI type according to at least one of the following: reception of downlink control signaling e.g., using similar methods as described herein (such signaling may indicate that UCI shall be split using the different PUCCH transmissions and that the first type of UCI is to be transmitted using resources of a specific cell (e.g., the cell on which the control signaling has been received)); reception of downlink control signaling, e.g., using similar methods as described herein (such signaling may include a UCI request where the indicated UCI may be routed to a first specific PUCCH resource and/or PUCCH transmission (e.g., possibly the resource indicated by dynamic scheduling, e.g., as described herein) while other feedback may be routed to a second specific PUCCH resource and/or PUCCH transmission (e.g., according to other methods to determine a PUCCH resource), or vice-versa); the PCell always (or the PSCell if for the MCG) or, alternatively, the SCell always; the WTRU selects the PUCCH with sufficient capacity (and/or with the best expected transmission performance); the WTRU selects the cell for which it has the lowest pathloss estimate; the WTRU selects the cell for which it also has resources for a PUSCH transmission (only if simultaneous PUSCH+PUCCH transmission is configured for the WTRU); and according to a semi-static configuration.

In an example, a WTRU may select a single PUCCH when multiple are available. In a possible example, a WTRU may select a single PUCCH when multiple are available only if the WTRU may perform transmission on different PUCCHs simultaneously. In another example, the WTRU may select the serving cell with the PUCCH according to at least one of the following: the WTRU selects the cell based on received control signaling similar to the above; reception of downlink control signaling, e.g., using similar methods as described herein, (such signaling may include dynamic scheduling for UCI transmission, e.g., according to that described herein); the WTRU selects the PUCCH with sufficient capacity (and/or with the best expected transmission performance); the WTRU selects the cell for which it has the lowest pathloss estimate; and according to a semi-static configuration. In several examples, the WTRU may only consider cells in the activated state.

The WTRU may be configured with a plurality of PUCCH resources on at least one SCell. Possibly, the WTRU may be configured with a restriction on the number of simultaneous uplink transmissions it may perform. Such restriction may be for all transmissions of the WTRU (e.g., including all transmission for all configured cells or CGs), for all transmission of a given CG of the WTRU's configuration, for all physical transmissions of a specific type (e.g., only for PUCCH transmission) and/or for all transmission of a certain type (e.g., only for UCI transmissions).

In such case, the WTRU may determine what uplink transmission it may use for the transmission of UCI according to solutions described herein. In an example, a WTRU may determine uplink routing as a function of restrictions.

In one method, the WTRU may determine how to route transmission of UCI as a function of restrictions applicable to the number of simultaneous uplink transmissions (and, possibly, only for simultaneous PUCCH transmissions). For example, the WTRU may determine that transmission of at least some of the UCI should be performed in a given subframe according (and possibly for a given CG) to at least one of the following: the WTRU may perform at most a number X of transmission on PUCCH (for example, the WTRU may determine the applicable X number of serving cells with PUCCH resources according to at least one of the following: in decreasing order of required transmit power for the PUCCH transmission; in increasing order of the estimated pathloss reference for the corresponding carrier; and in decreasing order of the PUCCH capacity); and the WTRU may perform at most a number X of transmission on PUCCH for a given group of cells (e.g., at most one PUCCH transmission per PUCCH group if a group may be configured using more than one PUCCH resource. The WTRU may use similar methods as for the previous case possibly applied per group of cells).

The WTRU may be configured with at least one serving cell using a carrier that is operating in an unlicensed frequency band (hereafter "LAA-Cell"). The following solutions describe how the WTRU may determine what uplink resource to use for the transmission of at least some (or all) of the generated UCI as a function of the type of access, type of band (e.g., licensed or unlicensed), the type of UCI itself (e.g., HARQ A/N, CQI, PMI/RI or the like) and/or received control signaling (e.g., similar as the signaling aspects described herein).

In an example, such as an example method, the WTRU may route UCI on resources of a serving cell of a licensed band. The WTRU may determine that the applicable UCI may be transmitted using uplink resources of a serving cell of the WTRU's configuration associated with a carrier in a frequency band used for licensed operation. The WTRU may make such determination independently of whether or not the WTRU has an uplink transmission scheduled for uplink resources of a LAA-Cell. Alternatively, the WTRU may transmit at least part of the UCI on a PUSCH transmission of the LAA-Cell (if available) such that the WTRU may make such routing determination only when there is no PUSCH transmission for the LAA-Cell.

Such applicable UCI may be determined according to at least one of the following. The WTRU may not transmit any UCI using resources of a LAA-Cell. For example, the WTRU may route any UCI related to the LAA operation to a transmission associated with a carrier in the licensed domain independently of whether or not the WTRU has a resource for a PUSCH transmission for a LAA-Cell. In another example, the WTRU may transmit only UCI associated with the LAA-Cell using resources of a LAA-Cell when available, otherwise the UCI may be routed to a resource of a cell in the licensed domain. For example, the WTRU may route only UCI related to a LAA-Cell to a transmission on a resource of a LAA-Cell, if such transmission is available (e.g., a PUSCH transmission is scheduled). In a further example, the WTRU may perform any of the above, but only for the transmission of a specific type of UCI. For example, the WTRU may transmit (the more time-sensitive) HARQ A/N feedback related to the operation in the unlicensed domain only using resources of a cell in the licensed domain; in such case, other type of UCI may be transmitted using a PUSCH transmission in the unlicensed domain (if available) or using resources in the licensed domain (otherwise).

In a further example, applicable UCI may be determined by reception of downlink control signaling, e.g., using similar methods as described herein. Such signaling may include a UCI request where the indicated UCI may be generated based on the status of the HARQ processes at the time of the reception of the control signaling, e.g., the UCI may be associated with the most recent state of the respective HARQ process(es) and not necessarily associated with transmissions received simultaneously and/or during the time interval associated with the reception of such control signaling. In addition, the WTRU may receive UCI scheduling information similar to that described herein for UCI feedback associated with such a cell.

Methods are described herein for determination of uplink resources for UCI transmission. Methods are described herein such that the WTRU may determine, at least in part, what resource to use for at least some UCI based in downlink control information, for example, dynamic scheduling.

Methods are described herein for downlink control signaling with DCI(UCI). In an example, the WTRU may receive dynamic scheduling information for the UCI. Such dynamic scheduling information may be received on PDCCH using DCI. Such scheduling information may be included in an existing DCI format (e.g., using one or more indices to refer to specific control information) or in a dedicated DCI format. Such DCI may be further referred to herein as DCI(UCI).

Dynamic scheduling may include UCI request and/or resource allocation. Such DCI(UCI) may indicate at least one of: a UCI request (e.g., by which the WTRU may determine what UCI to include in a given transmission); and UCI scheduling information (e.g., by which the WTRU may determine what uplink resource and how to transmit applicable UCI using the dynamically scheduled information.

In an example, DCI(UCI) may indicate a UCI request. A UCI request may be used to determine what UCI to generate for transmission. In an example, the WTRU may determine, as a function of the UCI request, what feedback to include in a UCI transmission.

Further, a UCI request may be used to create a smaller UCI payload. In an example, the UCI request may be used to prioritize transmission of the requested UCI and possibly to drop (or down-prioritize) other UCI.

Also, a UCI request may be used to route a subset of UCI to a specific resource, scheduled or not. In an example, the UCI request may be used to assign the indicated UCI to a specific uplink resource, e.g., such as a resource indicated by the UCI scheduling information (if applicable, see examples herein).

A UCI request contents may include at least one of the following information: a type of UCI, a serving cell identity, a downlink HARQ process identity, a UCI size reduction method, a feedback group, and aperiodic requests. For example, the UCI request contents may include a type of UCI. The WTRU may determine what type of UCI in shall include in the UCI transmission, e.g., HARQ A/N only or also in combination with any applicable CSI. For example, the type may be implicit to the format of the DCI(UCI), e.g., based on the field arrangement in the DCI(UCI) format. For example, the DCI(UCI) format may include one field for a CSI request and one field for a HARQ A/N request (e.g., as separate bitmap fields).

In another example, the UCI request contents may include a serving cell identity. The WTRU may determine the identity of the serving cell(s) for which the request is applicable, e.g., the request for the concerned UCI may be applicable to all configured (and/or also possibly active) serving cells of the WTRU's configuration, or to a subset thereof, e.g., as indicated by the signaled identities.

For example, the identities may correspond to the serving cell identity configured by higher layer, to cells that are part of a group of cells (e.g., based on a configured grouping, based on grouping for PUCCH transmission—PUCCH group, based on Timing Advance Grouping (TAGs), only for a special cell—e.g., PCell of MCG or PSCell of SCG, or the like). Such identity may be based on the Carrier Field Indicator (CFI) used for cross-carrier scheduling.

In an example, the UCI request may indicate CSI only for subset of cells on a dynamically scheduled PUSCH, HARQ per legacy. For example, the UCI request may indicate that only CSI for a subset of serving cells is being requested e.g., for serving cell IDs 1 and 3. Such indication may be received using a bitmap arrangement similar to the example shown in Table 9. The WTRU may then include CSI for those cells with the applicable UCI for the uplink transmission.

The WTRU may perform such uplink transmission, e.g., using dynamic scheduling (e.g., possibly on PUSCH). In an example, such UCI request signaling for CSI may be only applicable to periodic CSI (e.g., periodic CQI reporting) or, preferably, for any type of CSI including aperiodic CSI. Table 9 is an example of a bitmap arrangement for a CSI feedback request.

TABLE 9

| 0 | 1 | 2 | 3 | 4 | 5 | 6 | 7 | ServCellID |
|---|---|---|---|---|---|---|---|------------|
| 0 | 1 | 0 | 1 | 0 | 0 | 0 | 0 | Report CSI |

In a further example, the UCI request contents may include a downlink HARQ process identity. The WTRU may determine the identity of the HARQ process(es) for which the request is applicable, e.g., when the type of UCI requested is HARQ feedback. For example, the control information may use, e.g., a bitmap representation of all HARQ processes of the WTRU in a specific order for each (and also possibly activated) cell of the WTRU's configuration, e.g., increasing order of the process ID for all applicable cells in increasing order, e.g., based on their respective serving cell identity. Table 10 is an example of a bitmap arrangement for a HARQ feedback request.

TABLE 10

| 0 | 1 | 2 | 3 | 4 | 5 | 6 | 7 | HARQ Process ID |
|---|---|---|---|---|---|---|---|-----------------|
| 0 | 1 | 0 | 1 | 0 | 0 | 0 | 1 | ServCellID = 0  |
| 1 | 0 | 0 | 0 | 1 | 0 | 0 | 0 | ServCellID = 1  |
| 0 | 0 | 0 | 0 | 0 | 0 | 0 | 0 | ServCellID = 2  |
| 1 | 0 | 1 | 1 | 1 | 1 | 0 | 0 | ServCellID = 3  |

In an example, HARQ feedback may be included only for specific processes for all applicable cells. For example, the WTRU may determine from the reception of a UCI request that it shall include HARQ feedback for processes x1, x3 and x7 for serving cell ID=0, x0 and x4 for serving cell ID=1 and x0, x2, x3, x4 and x5 for serving cell ID=3 as shown in Table 10. In such case, the WTRU may generate 10 bits of HARQ feedback for transmission on an uplink resource. The WTRU may then determine the applicable coding and the applicable uplink resource using any of the methods described herein or using legacy methods.

In an example, an overload may indicate the presence or absence of dynamic scheduling information for the processes. In an example, the HARQ feedback may correspond only to transmissions for which the WTRU has scheduling information (e.g., dynamic and/or configured/semi-persistent) such that the request may also indicate that the concerned processes have been scheduled. In such case, the WTRU may perform a verification to determine if (and possibly also for what serving cell) the WTRU has failed to successfully decode one (or more) PDCCH(s) for the concerned interval (e.g., "missed PDCCH"), if it has incorrectly decoded one (or more) PDCCH(s) successfully (e.g., "false positive").

In an example, a special case may be used for configured DL assignments. For a HARQ process configured with a downlink assignment for the concerned interval, the WTRU may determine that the UCI is always requested: in this case, the absence of a request for the concerned HARQ process may indicate that no dynamic scheduling was associated with the process while the presence of such request may additionally indicate that dynamic scheduling was associated with the process.

In an example, an overload may be used as PDCCH decoding help. In an example, the WTRU may determine that UCI request corresponds to all cells of the WTRU's configuration (and possible, activated cells only) and/or for all such cells associated with such control signaling, such that the WTRU may use the UCI-request information to perform decoding attempts only for cells for which HARQ feedback is requested.

In another example, a HARQ feedback request may be independent of DL scheduling, e.g., state of process. In an example, the HARQ feedback may correspond to the state of the concerned HARQ process(es) independently of the scheduling activity for the concerned process(es). In such case, no further verification may be performed by the WTRU regarding detection of missed PDCCH(s) and/or the possible occurrence of any false positive.

In a further example, the UCI request contents may include a UCI size reduction method. In an example, the WTRU may additionally determine what size reduction method to apply to the requested UCI, e.g., any other method described herein. For example, the UCI request may indicate that for cells for which HARQ A/N is to be reported, the WTRU should use bundling for HARQ A/N for cells configured with spatial multiplexing (e.g., multiple transport blocks per interval).

In yet a further example, the UCI request contents may include a feedback group, for example, as described herein. In an example, the WTRU may determine the set of PDSCH transmissions and/or HARQ processes for which it should provide feedback based on a dynamic feedback request field. Different codepoints of the field may map to different feedback groups (e.g., sets of PDSCH transmissions and/or HARQ processes) and these codepoint mappings may be configured semi-statically, possibly by RRC configuration.

In yet another example, the UCI request contents may include aperiodic requests. In an example, the WTRU may additionally determine from the UCI request that aperiodic uplink feedback should be sent.

The WTRU may implement additional behavior for HARQ A/N generated from the reception of one or more DCI(s) that activate or deactivate a configured downlink assignment and/or a configured uplink grant. In one method, the WTRU may always generate HARQ A/N report for such signaling independently of the UCI request. In one method, the WTRU may generate HARQ A/N report for such signaling if the serving cell on which the WTRU received the control signaling is included in the UCI request (e.g., let the network coordinate transmission of semi-persistent scheduling (SPS) commands and UCI requests coherently).

In another example, the WTRU may determine that the UCI indicated, e.g., using methods described herein, is not to be generated and/or not to be included in an uplink transmission. In other words, such signaling may be used to subdue some (or all) of the applicable UCI instead of being considered as a UCI request.

In an example, DCI(UCI) may indicate scheduling information for UCI. A UCI request may be used to determine what UCI to generate for transmission. In an example, the WTRU may determine, as a function of the UCI scheduling information, some or all the properties of the uplink transmission for at least some of the applicable UCI, e.g., possibly including the applicable transmission resources and/or the applicable transmission format (including one of modulation, (starting) resource block(s), number of resource blocks, spreading, spatial multiplexing, possibly timing and/or timing offset, one or more DM-RS sequence, or the like).

UCI scheduling information may include at least one of the following information: a physical channel type (PUCCH, PUSCH), physical channel type identity (e.g., PUCCH on PCell, PUCCH on SCell), serving cell identity, PUCCH/UCI feedback group identity, PUCCH format, PUSCH transmission parameters, PUCCH transmission parameters, channel coding, payload size, TPC command (power control information), and CSI request. Further, different combinations of the above scheduling information are possible, such as depending on whether the indicated resource is a PUSCH resource or a PUCCH resource.

UCI scheduling information may include a physical channel type (PUCCH, PUSCH). The WTRU may determine what type of physical channel to use for the transmission of UCI as a function of an indication inside the scheduling information. When no such indication is present, the WTRU may determine to use the PUCCH. When PUSCH is scheduled for transmission of UCI (possibly only), the WTRU may not perform any WTRU-autonomous retransmission for the concerned HARQ process.

UCI scheduling information may include a physical channel type identity (e.g., PUCCH on PCell, PUCCH on SCell). The WTRU may determine what physical channel of a certain type (e.g., PUCCH) to use for the transmission of UCI as a function of an indication (e.g., PUCCH on PCell, PUCCH on SCell) inside the scheduling information. When no such indication is present, the WTRU may determine to use a default PUCCH channel e.g., PUCCH on PCell. This may be applicable also to the transmission of feedback on PUSCH, e.g., when the PUSCH of the serving cell configured with PUCCH may be scheduled for UCI transmission.

UCI scheduling information may include a serving cell identity. The WTRU may determine the identity of the serving cell corresponding to the physical uplink resource. Serving cell identity, or CFI, may be used for PUSCH scheduling for UCI. For example, the WTRU may receive a value that corresponds to an identity of a serving cell. Such identity may be based on the serving cell identity used by other layers, e.g., servCell-ID in RRC. Alternatively, such identity may be based on a configured value for cross-carrier scheduling, e.g., a CFI. In an example, this may be applicable when the scheduling information may indicate resources on a PUSCH.

UCI scheduling information may include a PUCCH/UCI feedback group identity. The WTRU may determine the identity of the uplink feedback channel corresponding to the physical uplink resource as a function of an identity of a group of cells associated with a single uplink channel (e.g., a PUCCH group). This may be applicable also to the transmission of feedback on PUSCH, e.g., when the PUSCH of the serving cell configured with PUCCH may be scheduled for UCI transmission.

UCI scheduling information may include a PUCCH format. The WTRU may receive an indication of the PUCCH format to use inside the scheduling information, e.g., PUCCH format 3 or other formats.

UCI scheduling information may include PUSCH transmission parameters. The WTRU may receive similar information as for a grant for an uplink PUSCH transmission for the transmission on UCI feedback. In an example, such grant may be only for transmission of UCI.

UCI scheduling information may include PUCCH transmission parameters. The PUCCH transmission parameters may be similar to the parameters that the WTRU determines for existing PUCCH formats, e.g., PRB allocation.

UCI scheduling information may include channel coding. The WTRU may determine whether it should transmit one or a specific combination of UCI type as a function of the indicated channel coding method.

UCI scheduling information may include payload size. The WTRU may determine the amount of UCI to include in the uplink transmission as a function of the indicated payload size for the scheduled UCI transmission. In an example, if such information is absent, the WTRU may use any other methods such as those described herein and include the UCI request as described herein.

UCI scheduling information may include a TPC command (power control information). This TPC command may be similar to the legacy TPC command but may be interpreted as a function of whether the scheduling information is for PUSCH or a PUCCH transmission.

UCI scheduling information may include a CSI request. This CSI request may be similar to the legacy request. In an example, such a CSI request may override other CSI reporting for the concerned time interval (e.g., periodic CSI).

Further, different combinations of the above scheduling information is possible as part of PUCCH or PUSCH. For example, the WTRU may receive a DCI(UCI) that schedules transmission of UCI on PUSCH which DCI(UCI) may include the type of physical channel (i.e., PUSCH), the identity of the serving cell for the uplink transmission (e.g., serving cell 0—PCell), PUSCH transmission parameters, e.g., including a resource block assignment, a modulation and coding scheme (MCS) and a TPC.

For example, the WTRU may receive a DCI(UCI) that schedules transmission of UCI on PUCCH of the PCell which DCI(UCI) may include the type of physical channel (i.e., PUCCH), PUCCH transmission parameters, e.g., including a resource block assignment, and a TPC. Additionally, the DCI(UCI) may include a UCI request such that the WTRU determines what UCI to include in such transmissions. The WTRU may determine that the PUCCH of the PCell is being scheduled based on the identity of the cell on which the PDCCH for the DCI(UCI) was received.

In an example, DCI for UCI, or DCI(UCI) may be used. In an example, a dedicated DCI may be used. In another example, extensions to existing DCIs may be used.

In an example, DCI(UCI) may indicate any of the information described herein using a dedicated format that includes one (or more) field(s) for any of the aspects described herein or using one (or more) ind(ex/ices) inside the DCI(UCI) format.

In an example, no HARQ A/N may be generated by DCI, if transient. In an example, the WTRU may receive DCI (UCI). The WTRU may not generate and/or include any HARQ A/N to report feedback for the DCI itself. The WTRU may not do so if such DCI(UCI) is applied per subframe and/or per TTI.

In another example, HARQ A/N may be generated by DCI, if configured/activated over a period of time or deactivated. In an example, the WTRU may receive DCI (UCI). The WTRU may determine that the DCI(UCI) configures UCI reporting for a period longer than one subframe (or longer than one TTI), e.g., until it receives another DCI (UCI) that either modify or deactivate the configured UCI reporting. In such case, the WTRU may generate and/or include HARQ A/N feedback for such DCI(UCI), e.g., to report feedback for the reception of the DCI(UCI) itself. In one method, the WTRU may use the UCI reporting method(s) applicable prior to the reception of such DCI (UCI) for HARQ A/N report of the concerned DCI(UCI). The WTRU may start using the new configuration in subframe n+x+1 when such DCI(UCI) is received in subframe n. For example, x may be equal to 4 and the WTRU may apply the new configuration starting from the subframe following the transmission of the HARQ A/N report for the concerned DCI(UCI). In one example, the WTRU may use the new configuration indicated in the DCI(UCI) itself for HARQ A/N reporting of the concerned DCI(UCI). The WTRU may start using the new configuration in subframe n+x when such DCI(UCI) is received in subframe n. For example, x may be equal to 4 and the WTRU may apply the new configuration starting from the subframe of the transmission of the HARQ A/N report for the concerned DCI (UCI).

In an example, UCI not requested for an indicated type may be subdued/dropped. In an example, the WTRU may determine that it may not transmit any UCI that is not part of a UCI request, when such request is received.

In another example, other methods may be used if UCI not part of any UCI request. In an example, the WTRU may determine that it may transmit any UCI that is not part of a UCI request, when such request is received, using other methods, e.g., such as legacy methods. For example, when UCI scheduling indicates a transmission on PUCCH, the WTRU may route remaining UCI to a PUSCH transmission (if such is available) according to legacy methods. For example, when UCI scheduling indicates a transmission on PUSCH, the WTRU may route remaining UCI to a PUCCH transmission according to legacy methods, if both PUSCH and PUCCH are simultaneous and possibly also for the same serving cell, only if the WTRU is configured for simultaneous PUSCH/PUCCH transmissions.

In another example, the WTRU may determine that it may not transmit any UCI unless it receives a DCI(UCI) that includes a UCI request. In an example, the WTRU may include UCI to any PUSCH transmission, e.g., according to legacy methods even when it does not receive a DCI(UCI) that includes a DCI request.

In another example, a UCI type not part of the request may be either subdued/dropped or legacy transmission methods may be used. In an example, the WTRU may determine that it may not transmit any UCI that is not part of a UCI request, when such request is received.

In another example, a DCI(UCI) request may be for HARQ feedback only. For example, the WTRU may receive a DCI(UCI) that requests HARQ A/N feedback for specific HARQ processes and/or for specific serving cells only.

In another example, an alternative determination may be made. In some examples, any of the information described herein for the UCI request or for the UCI scheduling information may be implicitly derived by other means. For example, a specific RNTI may be assigned to indicate the type of the DCI (e.g., DCI formats 0, 1, etc. compared with DCI format DCI(UCI)), to indicate the type of UCI request, to indicate the type of physical channel (e.g., PUSCH vs PUCCH), to indicate the identity of the cell, or the like. Similarly, specific regions of the PDCCH Search Space or specific DCI Aggregation Levels or specific size for the CRC of the DCI may be assigned and may be used to determine similar information.

In another example, a semi-persistent allocation may be made. Scheduling information may be semi-persistently configured. In such case, the configured information may be used as the default scheduling information. In such case, the WTRU may receive a DCI(UCI) that overrides configured scheduling information for the applicable serving cell. In such case, the WTRU may refrain from performing any transmission using a configured allocation when no UCI is generated and/or available for transmission for the concerned time interval. Alternatively, for HARQ feedback the WTRU may report the value of the HARQ feedback following the last reception for the concerned processes, while for CSI feedback the WTRU may consider this as a periodic reporting configuration (e.g., if an aperiodic CSI configuration is also present).

In another example, the selection of channel coding may be as a function of dynamic scheduling information. The WTRU may select the appropriate channel coding as a function of the UCI requested (e.g., channel coding may be selected as per any of the methods described herein or using legacy methods for a different combination of at least one of HARQ A/N, periodic CSI, CQI/PMI and scheduling request) and/or the scheduling parameters for UCI (e.g., whether it is on PUCCH or on PUSCH (if applicable)).

In another example, the scheduling information for UCI may indicate a resource corresponding to a PUCCH transmission even if the WTRU is expected to perform a transmission on PUSCH simultaneously, e.g., for a given cell group (CG). In such case, the WTRU may perform the transmission of the applicable UCI using the indicated resource if simultaneous PUCCH and PUSCH transmission is configured, e.g., for the concerned CG. Otherwise, if the WTRU does not perform simultaneous PUCCH/PUSCH transmissions it may include the applicable UCI information (e.g., such as UCI requested in the dynamic scheduling information) in a PUSCH transmission according to legacy behavior. In an example, the WTRU may include SR in the scheduled UCI transmission.

In some examples, the WTRU may be configured to transmit periodic CSI reports for more than one cell (multiple periodic CSI reports) in a single subframe over PUCCH or PUSCH. The WTRU may also be configured to transmit HARQ-ACK and/or SR in the same subframe.

In some examples, a maximum payload may be configured in case of transmission of HARQ-ACK and periodic CSI. The WTRU may be configured with a maximum payload for each PUCCH resource that can be used for the transmission of HARQ-ACK, periodic CSI reports and/or SR in a subframe. The maximum payload may be expressed in terms of bits or in terms of a maximum code rate, in conjunction with the known number of available coded bits for the configured resource. Such maximum payload may be dependent on the combination of UCI being transmitted, e.g., whether HARQ-ACK alone or a combination of HARQ-ACK, periodic CSI and SR is transmitted.

Alternatively or in addition, the WTRU may be configured with a maximum payload of periodic CSI reports for each PUCCH resource which is applicable independently of the number of HARQ-ACK and SR bits that are transmitted in the resource. Such maximum payload of periodic CSI reports may be the same as the configured maximum payload of the PUCCH resource that is used in the subframe or that would be used for the transmission of periodic CSI only in the subframe according to one of the solutions described herein. Alternatively, the maximum payload of periodic CSI reports in case a simultaneous transmission with HARQ-ACK and/or SR may be configured independently.

The WTRU may transmit a smaller number of periodic CSI reports than the configured number in a subframe where HARQ-ACK and/or SR are also transmitted in case the payload of periodic CSI reports would exceed a configured maximum payload of periodic CSI reports, or in case the total payload of HARQ-ACK, SR and periodic CSI reports would exceed a configured maximum payload for the PUCCH resource (or the total number of UCI bits). The subset of periodic CSI reports that is transmitted may be determined according to one of the solutions described herein.

In some examples, when transmission of HARQ-ACK collides with transmission of multiple periodic CSI reports, the WTRU may transmit on one of the PUCCH resources configured for the transmission of multiple periodic CSI according to a solution described herein. Alternatively, the WTRU may transmit on a periodic PUCCH resource indicated by downlink control information (i.e., a TPC field of SCell assignments/ARI).

The WTRU may be configured with more than one PUCCH resource for the transmission of multiple periodic CSI reports in a subframe. In this case, the WTRU may determine the PUCCH resource according to at least one of the following solutions.

In an example, the WTRU may select a PUCCH resource based on at least one priority criterion. For example, the WTRU may select the resource associated with the serving cell whose periodic CSI report has the highest priority in the subframe among all serving cells for which a periodic CSI report is being transmitted in the subframe.

In another example, the WTRU may select a PUCCH resource based on the total payload of the periodic CSI reports to be transmitted in the subframe, or the total payload of HARQ-ACK (if applicable), SR (if applicable) and periodic CSI reports. For example, the WTRU may select a first PUCCH resource if the total payload does not exceed a threshold, and a second PUCCH resource otherwise. The threshold may correspond to, or be a function of, the maximum payload that can be supported for the first PUCCH resource, which may be less than the maximum payload that can be supported for the second PUCCH resource.

In a further example, the WTRU may select a PUCCH resource as a function of the required transmission power based on the power control parameters and formulas associated with each resource. The transmission power may be a function of at least one of resource-specific parameters, format-specific parameters, payload, number of resource blocks, code rate, power control adjustment, and/or path loss. For example, the WTRU may select the resource that minimizes the required transmission power. In another example, the WTRU may select a first resource if the required transmission power for this resource is below a threshold, and a second resource otherwise, possibly only under the condition that the required transmission power for the second resource is lower than the required transmission power for the first resource plus a configured offset in dB terms. In the above, the required transmission power for each resource may be adjusted to correspond to a peak transmission power to account for possible differences in cubic metric (CM) and/or peak-to-average power ratio (PAPR) between different resources. The adjustment may be a function of at least one property associated with the PUCCH resource, such as the PUCCH format or the number of resource blocks.

The WTRU may select a PUCCH resource based on whether HARQ-ACK and/or SR are also transmitted in the same subframe. The PUCCH resource to use in case HARQ-ACK and/or SR are also transmitted may be signaled from downlink control information, or configured by higher layers only.

In still another example, the WTRU may select a PUCCH resource based on the timing of the subframe. For example, a first set and a second set of subframes may be associated with a first and a second PUCCH resource, respectively. Each set may be defined in terms of period and offset relative to the frame number and/or subframe number, or in terms of an index representing the period and offset. For example, one set may correspond to subframes occurring with a period of 20 ms which include subframe #3 of frame #0. The WTRU may select the first PUCCH resource in a subframe belonging to the first set only, and the second PUCCH resource in a subframe belonging to the second set only. For a subframe belonging to both sets, the WTRU may select the PUCCH resource based on at least one of the following. In an example, the WTRU may select the PUCCH resource based on a priority criterion. The priority may be pre-defined, or may be based on a property of the resource such as the maximum payload (or code rate) supported, the number of resource blocks, the starting resource block number or the format. For example, the priority may be given to the PUCCH resource that can support the highest maximum payload. In another example, the WTRU may select the PUCCH resource based on a solution already described elsewhere herein, such as based on the total payload to be transmitted, the required transmission power and/or the priorities of associated serving cells for which a report is being transmitted.

In some examples, the WTRU may transmit a smaller number of periodic CSI reports than the configured number due to a power limitation. The WTRU may first determine a maximum payload for periodic CSI reports and CRC (if applicable) or for the combination of periodic CSI reports, SR, HARQ-ACK feedback and CRC (if applicable) based on the maximum power available for the transmission, the type of channel (PUCCH or PUSCH), the format in case of PUCCH, and other parameters and measurements (e.g., path loss) used for power control. The maximum payload may take into account the number of bits required for CRC addition, if applicable. Such maximum payload may be referred to as power-limited payload. In case the WTRU is configured with more than one PUCCH resource, the WTRU may first determine the PUCCH resource based on a solution described herein and then determine the power-limited payload associated with the resource. Alternatively, the WTRU may select the PUCCH resource which results in the highest possible power-limited payload.

The power-limited payload may be constrained to correspond to one of a finite set of allowed values for the maximum payload or to a parameter from which the maximum payload can be derived (such as a maximum number of periodic reports or a maximum code rate). Such a set of allowed values may correspond the set of possible values that can be configured as part of a PUCCH resource.

The maximum power available for the transmission may be determined using existing power scaling and allocation solutions when multiple cells and/or cell groups are configured. In some solutions, the WTRU may be configured with a maximum power specific to a PUCCH transmission containing periodic CSI. In this case the maximum power available for the transmission may be the smallest value between this configured maximum power for periodic CSI and the maximum available power obtained from existing solutions.

The maximum payload in case of PUCCH may be determined using a relationship between a number of information bits and a power offset applicable to the PUCCH format used for transmitting periodic CSI reports. The maximum payload in case of PUSCH may be determined from a maximum number of symbols (or ratio of symbols) that may be used for the encoding of the different types of CSI reports (RI, CQI and PMI).

When the number of bits required to transmit a set of periodic CSI reports according to configuration exceeds a maximum payload according to one of the solutions described herein, the WTRU may transmit a subset of CSI reports based on a priority rule. The priority rule may be based on legacy priority rules (i.e. type of report and serving cell index). The priority rule may also be based on at least one of the following: the time since the last transmission of a periodic report for a cell; the value of the CQI and/or RI. Possibly, only reports for which CQI/RI is above or below a configured threshold may be transmitted; and/or the change of value of the CQI and/or RI since the last transmission of the corresponding report for a cell (in an example, reports with highest change of CQI and/or RI may be prioritized).

The WTRU may include a cell identity along with each set of CSI reports for a cell at least in case the priority cannot be known in advance by the network or when only a subset of the reports are transmitted. The WTRU may also transmit an indication, possibly encoded separately, that only a subset of the reports are transmitted due to power limitation.

In case the power-limited payload is lower than the number of bits required for the transmission of only HARQ-ACK bits or HARQ-ACK and SR bits (plus CRC bits if applicable), the WTRU may not include any periodic CSI report in the transmission. In some solutions, the WTRU may not include any periodic CSI in the transmission whenever the power-limited payload is lower than what would be required for the transmission of all periodic CSI reports, HARQ-ACK (if applicable), SR (if applicable) and CRC (if applicable) according to a configuration. In such a case, the WTRU may transmit only HARQ-ACK, SR and CRC, if applicable.

In some examples, the payload may be set to one of a finite set of possible value. For example, the WTRU may use padding (e.g. append the payload with a number of "0" bits) such that the payload matches one of a set of possible payload values that may be pre-defined or configured by higher layers. This may facilitate blind detection of the payload by the receiver at the network side. Such padding may occur after reduction of payload (for periodic CSI or other UCI) according to one of the above solutions. Possibly, padding may be performed only in case payload reduction occurred due to a power limitation.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit receive unit (WTRU) comprising a processor and a memory, the processor and the memory configured to:
   receive a first downlink control information (DCI), the first DCI comprising scheduling information for a first downlink transmission, wherein the first DCI comprises an indication that hybrid automatic repeat request (HARQ) feedback for the first downlink transmission is not expected in response to the first DCI;
   receive a second DCI, the second DCI comprising a request to transmit the HARQ feedback for the first downlink transmission; and
   transmit the HARQ feedback for the first downlink transmission scheduled by the first DCI based on the request comprised in the second DCI.

2. The WTRU of claim 1, wherein the first downlink transmission comprise a first physical downlink shared channel (PDSCH) transmission.

3. The WTRU of claim 1, wherein the second DCI indicates scheduling information for transmission of the HARQ feedback for the first transmission scheduled by the first DCI.

4. The WTRU of claim 1, wherein the first DCI is received via a first physical downlink control channel (PDCCH) transmission, and the second DCI is received via a second PDCCH transmission.

5. The WTRU of claim 1, wherein the second DCI comprises scheduling information for a second downlink transmission.

6. The WTRU of claim 5, wherein HARQ feedback for the second downlink transmission is transmitted with the HARQ feedback for the first downlink transmission.

7. The WTRU of claim 1, wherein the indication that the HARQ feedback for the first transmission is not expected in response to the first DCI comprises a codepoint of the first DCI being set to a specific value.

8. The WTRU of claim 1, wherein the second DCI does not include scheduling information for a physical downlink shared channel (PDSCH) transmission.

9. A method performed by a wireless transmit receive unit (WTRU), the method comprising:
   receiving a first downlink control information (DCI), the first DCI comprising scheduling information for a first downlink transmission, wherein the first DCI comprises an indication that hybrid automatic repeat request (HARQ) feedback for the first downlink transmission is not expected in response to the first DCI;
   receiving a second DCI, the second DCI comprising a request to transmit the HARQ feedback for the first downlink transmission; and
   transmitting the HARQ feedback for the first downlink transmission scheduled by the first DCI based on the request comprised in the second DCI.

10. The method of claim 9, wherein the first downlink transmission comprise a first physical downlink shared channel (PDSCH) transmission.

11. The method of claim 9, wherein the second DCI indicates scheduling information for transmission of the HARQ feedback for the first transmission scheduled by the first DCI.

12. The method of claim 9, wherein the first DCI is received via a first physical downlink control channel (PDCCH) transmission, and the second DCI is received via a second PDCCH transmission.

13. The method of claim 9, wherein the second DCI comprises scheduling information for a second downlink transmission.

14. The method of claim 13, wherein HARQ feedback for the second downlink transmissions is transmitted with the HARQ feedback for the first downlink transmission.

15. The method of claim 9, wherein the indication that the HARQ feedback for the first transmission is not expected in response to the first DCI comprises a codepoint the first DCI being set to a specific value.

16. The method of claim 9, wherein the second DCI does not include scheduling information for a physical downlink shared channel (PDSCH) transmission.

17. A base station comprising a processor and a memory, the processor and the memory configured to:
- transmit a first downlink control information (DCI), the first DCI comprising scheduling information for a first downlink transmission, wherein the first DCI comprises an indication that hybrid automatic repeat request (HARQ) feedback for the first downlink transmission is not expected in response to the first DCI;
- transmit a second DCI, the second DCI comprising a request to transmit the HARQ feedback for the first downlink transmission; and
- receive the HARQ feedback for the first downlink transmission scheduled by the first DCI based on the request comprised in the second DCI.

* * * * *

UNITED STATES PATENT AND TRADEMARK OFFICE
CERTIFICATE OF CORRECTION

PATENT NO. : 12,126,570 B2
APPLICATION NO. : 18/460935
DATED : October 22, 2024
INVENTOR(S) : Paul Marinier et al.

Page 1 of 1

It is certified that error appears in the above-identified patent and that said Letters Patent is hereby corrected as shown below:

In the Claims

In Claim 14: Column 62, Line 62, delete "transmissions", and insert --transmission--

Signed and Sealed this
Twenty-fifth Day of February, 2025

Coke Morgan Stewart
*Acting Director of the United States Patent and Trademark Office*